United States Patent [19]
Lin

[11] Patent Number: 5,904,214
[45] Date of Patent: May 18, 1999

[54] POWER ASSIST ANTI-TIP WHEEL SYSTEM FOR INVALID CARRIAGE

[76] Inventor: David Jung-Ching Lin, 2801 W. Sepulveda Blvd., #112 Torrance, Calif. 90505

[21] Appl. No.: 08/891,679

[22] Filed: Jul. 11, 1997

[51] Int. Cl.⁶ .................................................. B62D 15/00
[52] U.S. Cl. .............................. 180/15; 180/16; 180/22; 180/907
[58] Field of Search ................................ 180/15, 16, 22, 180/907

[56] References Cited

U.S. PATENT DOCUMENTS

| 3,767,000 | 10/1973 | Smith | 180/16 |
|---|---|---|---|
| 3,905,437 | 9/1975 | Kaiho et al. | 180/15 |
| 4,176,726 | 12/1979 | Schaeff | 180/15 |
| 5,222,567 | 6/1993 | Broadhead et al. | 180/15 |
| 5,762,154 | 6/1998 | Hsu | 180/15 |

*Primary Examiner*—Kenneth R. Rice
*Attorney, Agent, or Firm*—Pro-Techtor International Services

[57] ABSTRACT

Disclosed is a power assist anti-tip wheel system for invalid carriage including at least one connecting support, at least one assist anti-tip wheel, and at least one power driving means. The connecting support is fixedly or detachably connected at one end to a front or a rear side of the invalid carriage. The anti-tip wheel is associated with the connecting support so that it is located in front of or behind the invalid carriage. The power driving means is also associated with the connecting support to drive the anti-tip wheel to rotate when the invalid carriage travels onto a slope or passes a recess or a bulge on a road surface and two drive wheels thereof become suspended and idling. The power driving means can be automatically actuated via a sensing circuit or be manually actuated via a push button. When the anti-tip wheel is driven by the power driving means to rotate, it provides an assistant power source to the invalid carriage and help the same to keep moving forward when the drive wheels of the invalid carriage are idling.

12 Claims, 36 Drawing Sheets

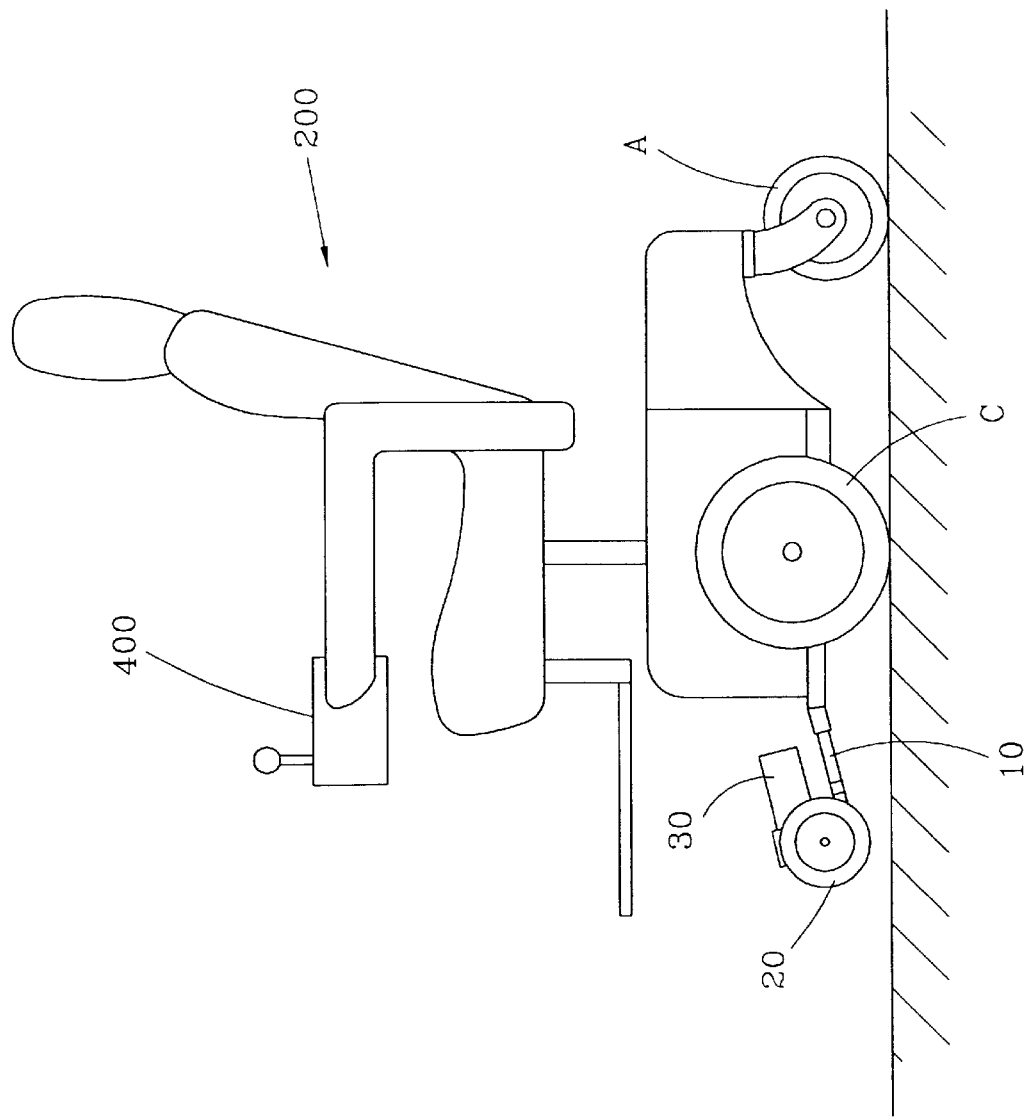

POWER ASSIST ANTI-TIP WHEEL SYSTEM FOR INVALID CARRIAGE

BACKGROUND OF THE INVENTION

The present invention relates to a power assist anti-tip wheel system for invalid carriage, and more particularly to an anti-tip wheel system equipped with assistant power source to assist an invalid carriage in travelling on a rough road. The upgrade of our living quality and medical level allows us to help more invalid people who are otherwise ignored by the general public. Meanwhile, there are better welfare policies and systems developed in nowaday society, including the provision of various types of traffic means suitable for invalids to assist in their movement. For those invalids who can not walk, there were manually-operated wheelchairs available to assist them to move around. However, such manually-operated wheelchairs can be used only by those invalids whose hands and upper half trunk are in good condition. To meet the needs of invalids whose hands and upper half trunk are not in good condition, there is now electric wheelchair developed and available in the market. The introduction of electric wheelchair to the market is really a good news to the invalids who can not move their hands and legs easily. Since the electric wheelchair has timely solved the pressing need of invalids in traffic even though there are still high risks of accidents on road, the quantity of such electric wheelchair increases from day to day.

On the other hand, motorized vehicles, particularly the automobile and motorcycle, have become a necessary traffic means in our daily life. A problem with automobiles and motorcycles is their exhaust which seriously pollute the air. Under the inevitable trends of environmental protection, environmental friendly electric vehicles are developed and produced. Among these electric vehicles, there is a motorized invalid wheeled vehicle which is light in weight and easy to operate and is therefore widely welcome by many young students, housewives, invalids, and the aged. Such motorized invalid wheeled vehicle has gradually become a main traffic means of invalids for use within short distance.

FIGS. 1 and 2 illustrate two examples of the conventional motorized invalid wheeled vehicles for use by the aged and invalids. The transmission of such wheeled vehicles for use by the aged and invalids. The transmission of such motorized invalid wheeled vehicles can be generally divided into three types according to the designed center of gravity of the wheels, namely, the front-wheel drive, the rear-wheel drive, and the middle-wheel drive. In either drive type, it is necessary to mount at least one anti-tip wheel on the vehicle to prevent the vehicle body from tipping over forward or backward and thereby dangering the aged or invalid operating the vehicle. The motorized invalid wheeled vehicle shown in FIG. 1 is of the type of front-wheel drive with a center of gravity located at a front portion of the vehicle. And, the vehicle shown in FIG. 2 is of the type of rear-wheel drive with a center of gravity located at a rear portion of the vehicle. In either case, the motorized invalid wheeled vehicle is driven by a pair of drive wheels C provided between pilot wheels A and at least one assist anti-tip wheel B. The drive wheels C are actuated by an electric motor D to cause the invalid wheeled vehicle to move forward or backward and/or to turn rightward or leftward.

The at least one anti-tip wheel B is used to protect the short vehicle body from dangerously tipping over forward or backward during moving upward or downward on a slope or due to improper operation of the vehicle. As a result, the provision of the anti-tip wheels B have become a very important part of the motorized invalid wheeled vehicle. Generally, the anti-tip wheel B is located at a position slightly higher than a plane in which the drive wheels C and the pilot wheels A locate. The anti-tip wheel B must be adequately located at a proper height, lest it should become meaningless. An overhigh anti-tip wheel B shall fail to protect the vehicle from tipping over, and an overlow anti-tip wheel B shall always contact with the road surface and makes the operator uncomfortable during driving.

Moreover, in consideration of an active operation of the conventional motorized invalid wheeled vehicle, the pilot wheels A and the at least one assist anti-tip wheel B are so designed that they have diameters smaller than that of the drive wheels C. And, due to limitations in the transmission of power, the drive wheels C can not have a too big diameter as that of the general wheelchairs. As a result, the electric wheelchairs illustrated in FIGS. 1 and 2 can not be conveniently operated when they are used to travel on a rough road. FIGS. 3, 4 and 5 respectively illustrate the rear-wheel drive motorized invalid wheeled vehicle as shown in FIG. 2 travelling on an ascending slope, over a recess, and across a bulge. As shown in the figures, the drive wheels C tend to become suspended when the vehicle passes the slope, the recess or the bulge because there is a difference in height existed between such irregularities and the road surface, as well as because the drive wheels C, the pilot wheels A, and the at least one anti-tip wheel B are not on the same plane. When the drive wheels C become suspended without touching the road or ground surface, they shall fail to supply power to the vehicle for the same to move. That is, the drive wheels C shall idle and cause the whole vehicle to slide downward, be stuck in the recess, or be stopped at the bulge. These conditions surely will cause inconvenience and considerable dangerous conditions may also occur on the front-wheel drive motorized invalid wheeled vehicle illustrated in FIG. 1. Therefore, it is desirable to develop an improved motorized invalid wheeled vehicle to solve the above mentioned problems.

SUMMARY OF THE INVENTION

It is therefore a primary object of the present invention to provide a power assist anti-tip wheel system for invalid carriage, so that the invalid carriage passing a slope, recess or bulge on the road surface and therefore having suspended drive wheels may still quickly and easily leave the idle condition and contact with the road surface again under an assistant power supplied from a front or a rear end of the carriage to help driving the carriage forward. In brief, the present invention ensures an invalid carriage to move smoothly and safely without being affected by any irregularity on the road surface.

To achieve the above and other objects, the power assist anti-tip wheel system for invalid carriage according to the present invention mainly includes at least a connecting support, at least an assist anti-tip wheel, and at least a power driving means. The at least one connecting support may be in any suitable configuration for connecting at one end to a front or a rear end of an invalid wheeled vehicle or carriage. The at least one assist anti-tip wheel is connected to the at least one connecting support so that the anti-tip wheel is located in front of or behind the invalid vehicle or carriage. And, the at least one power driving means is also connected to the connecting support to drive the at least one anti-tip wheel to rotate. Whereby, when the invalid vehicle or carriage passes a slope, a recess or a bulge and drive wheels thereof become suspended and idling, the at least one power driving means shall be automatically actuated by an automatic sensor or be manually actuated through operating a control handle or push button to rotate the at least one assist anti-tip wheel and thereby helps the invalid vehicle or carriage to quickly leave the irregularities on the road surface and contact with the road surface and move again.

BRIEF DESCRIPTION OF THE DRAWINGS

The detailed structure, the adopted technical means, and the operation of the present invention can be best understood by referring to the following detailed description of the preferred embodiments and the accompanying drawings, wherein

FIG. 36 is a side view showing the present invention being used with a front-wheel drive invalid vehicle.

DETAILED DESCRIPTION OF THE PREFERRED EMBODIMENTS

Figure 1:
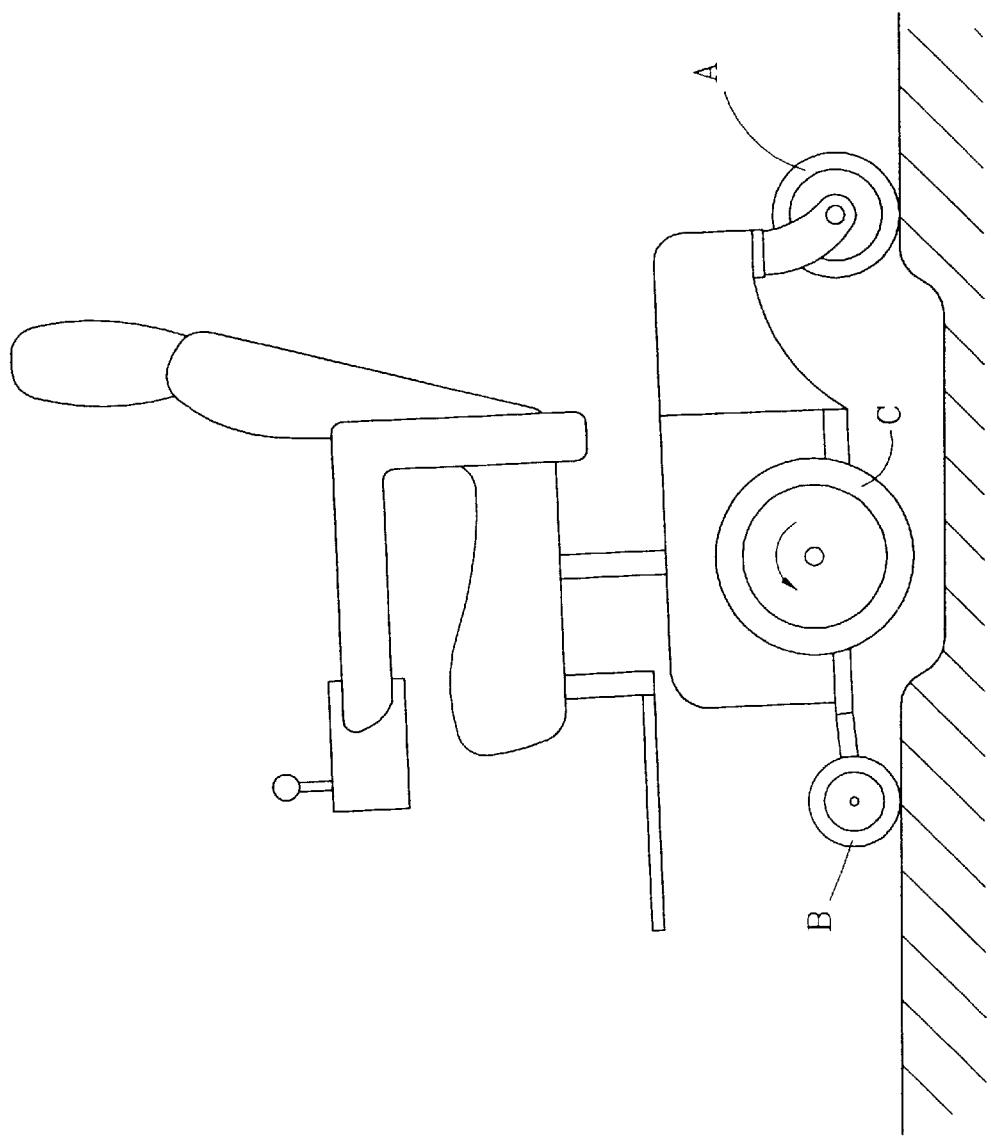
FIG. 1 is a side view showing a conventional motorized invalid wheeled vehicle.
Figure 2:
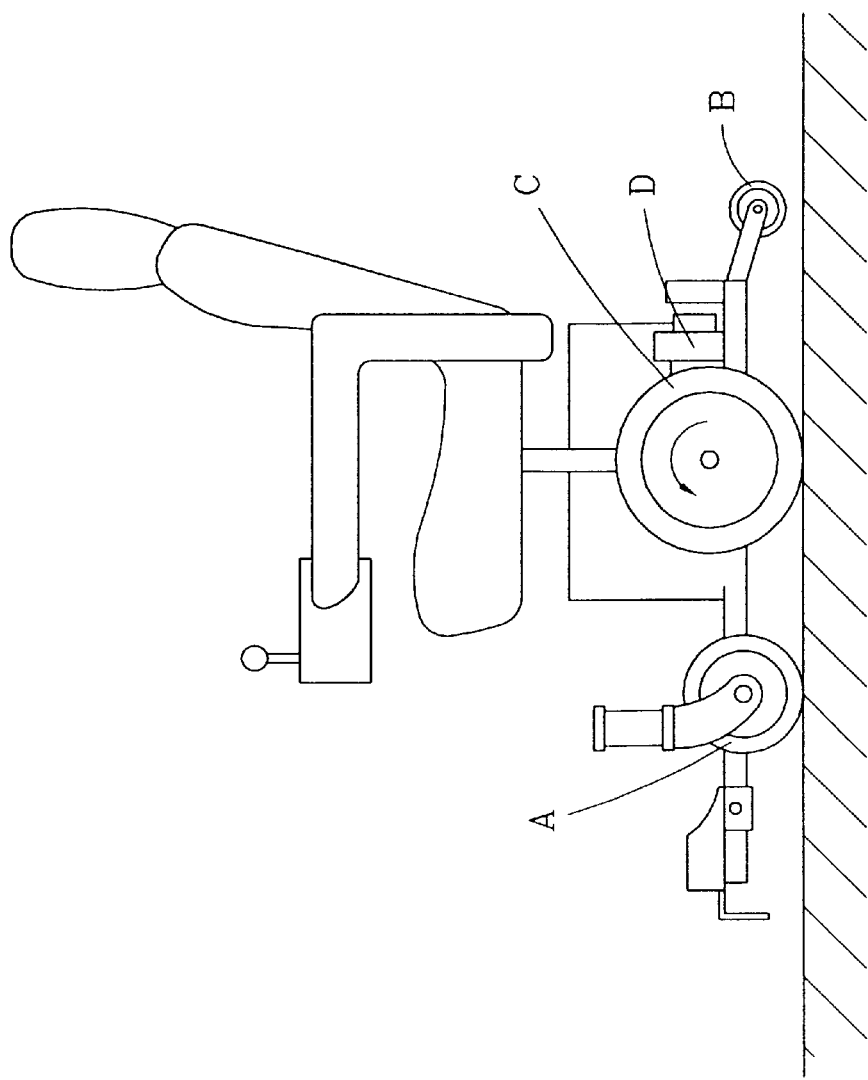
FIG. 2 is a side view showing another conventional motorized invalid wheeled vehicle.
Figure 3:
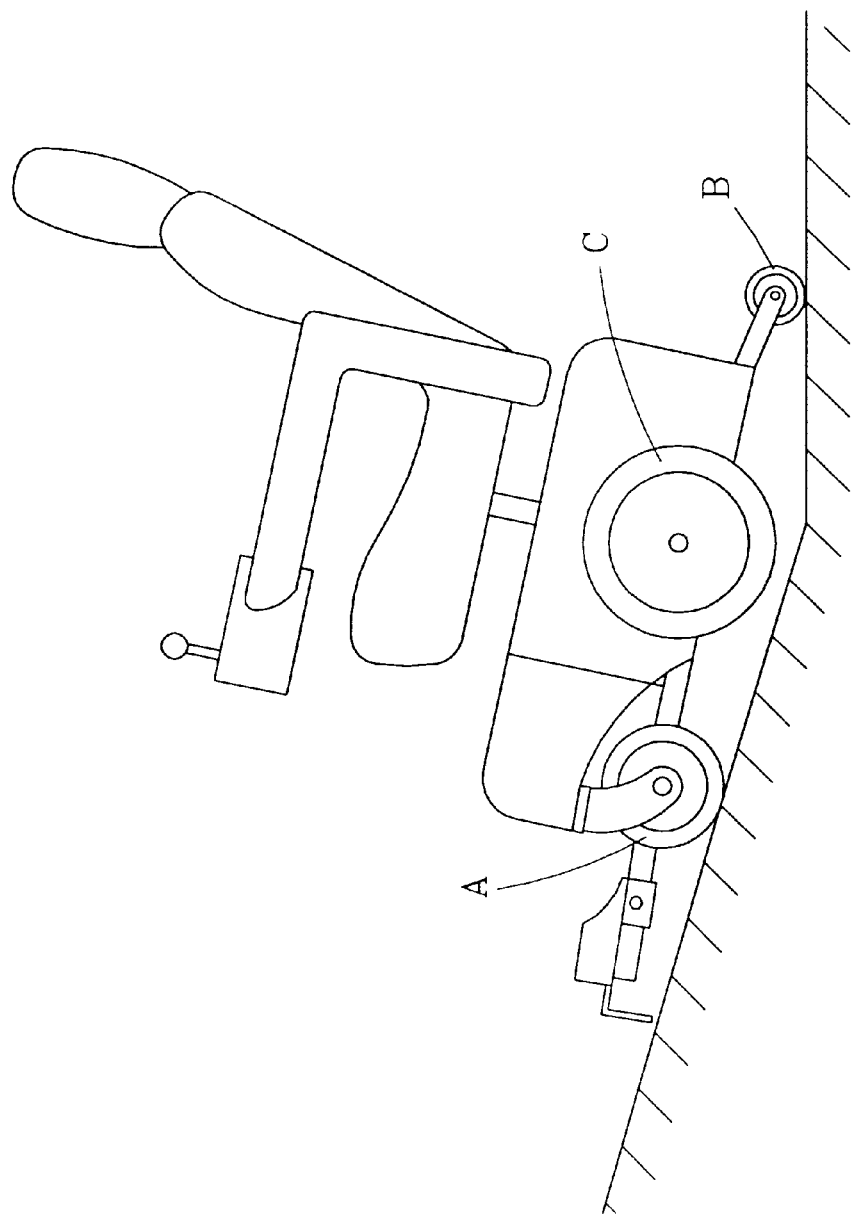
FIG. 3 is a side view showing the conventional motorized invalid wheeled vehicle of FIG. 2 moving onto a slope.
Figure 4:
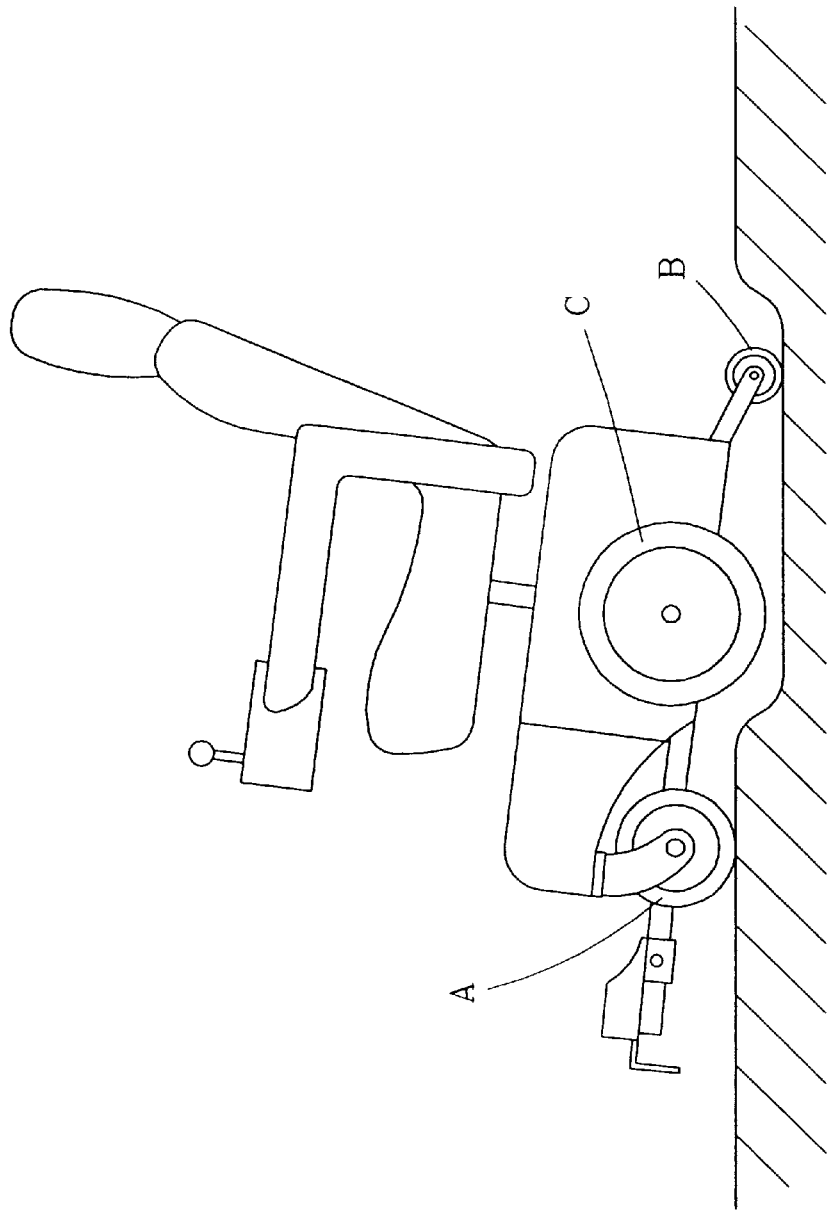
FIG. 4 is a side view showing the conventional motorized invalid wheeled vehicle of FIG. 2 passing over a recess on a road surface.
Figure 5:
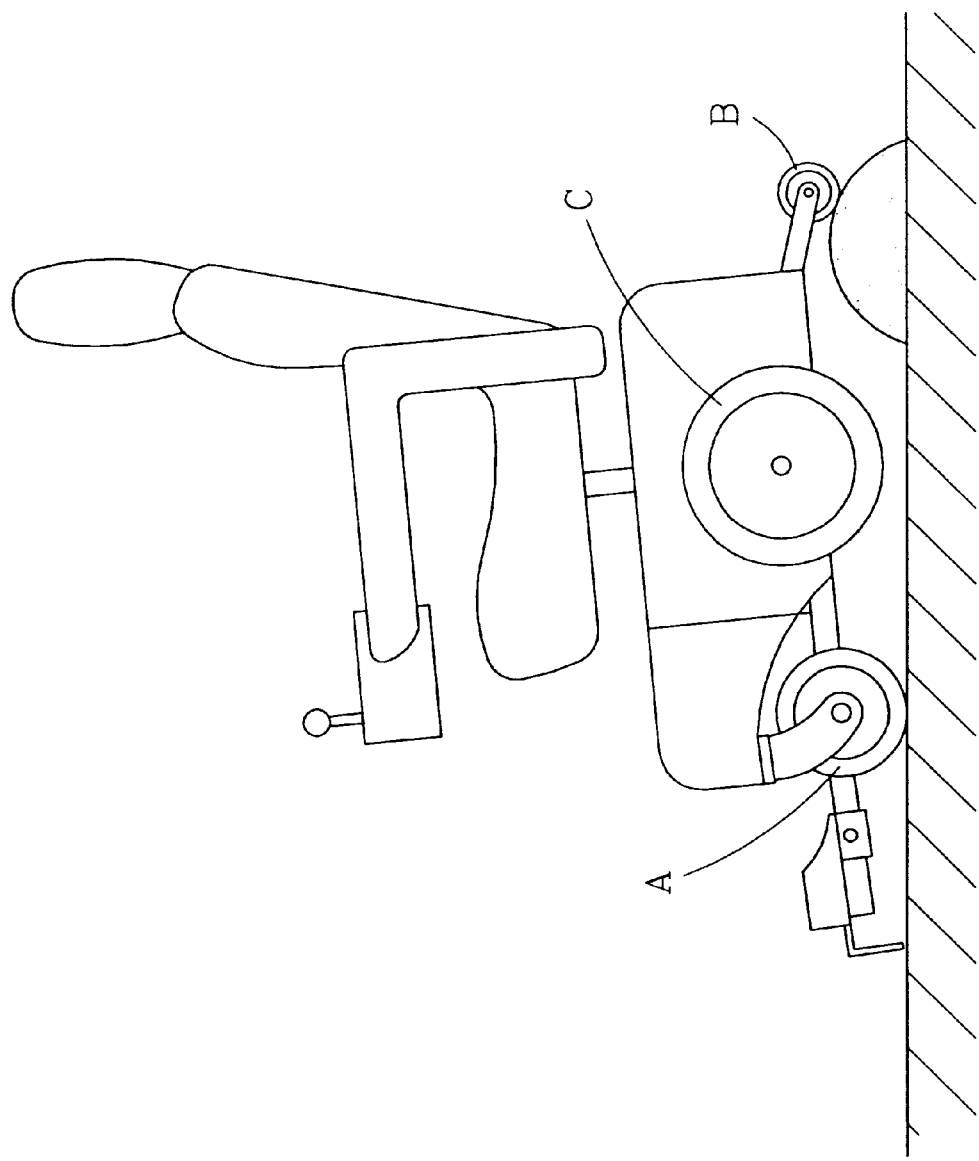
FIG. 5 is a side view showing the conventional motorized invalid wheeled vehicle of FIG. 2 passing across a bulge on the road surface.
Figure 6:
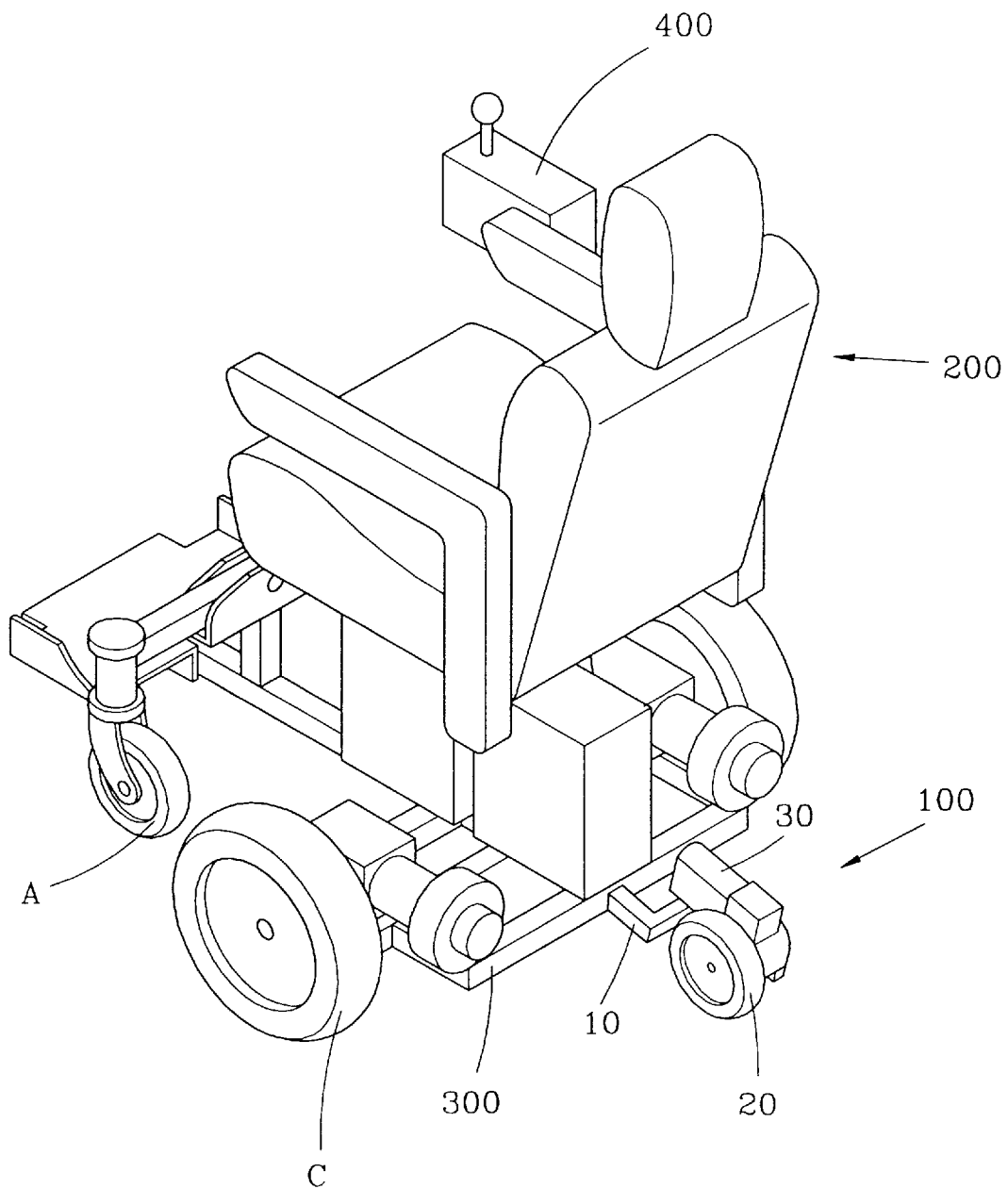
FIG. 6 is a perspective showing an invalid carriage with a first embodiment of the power assist anti-tip wheel system according to the present invention fixedly connected to a rear end of the invalid carriage.
Figure 7:
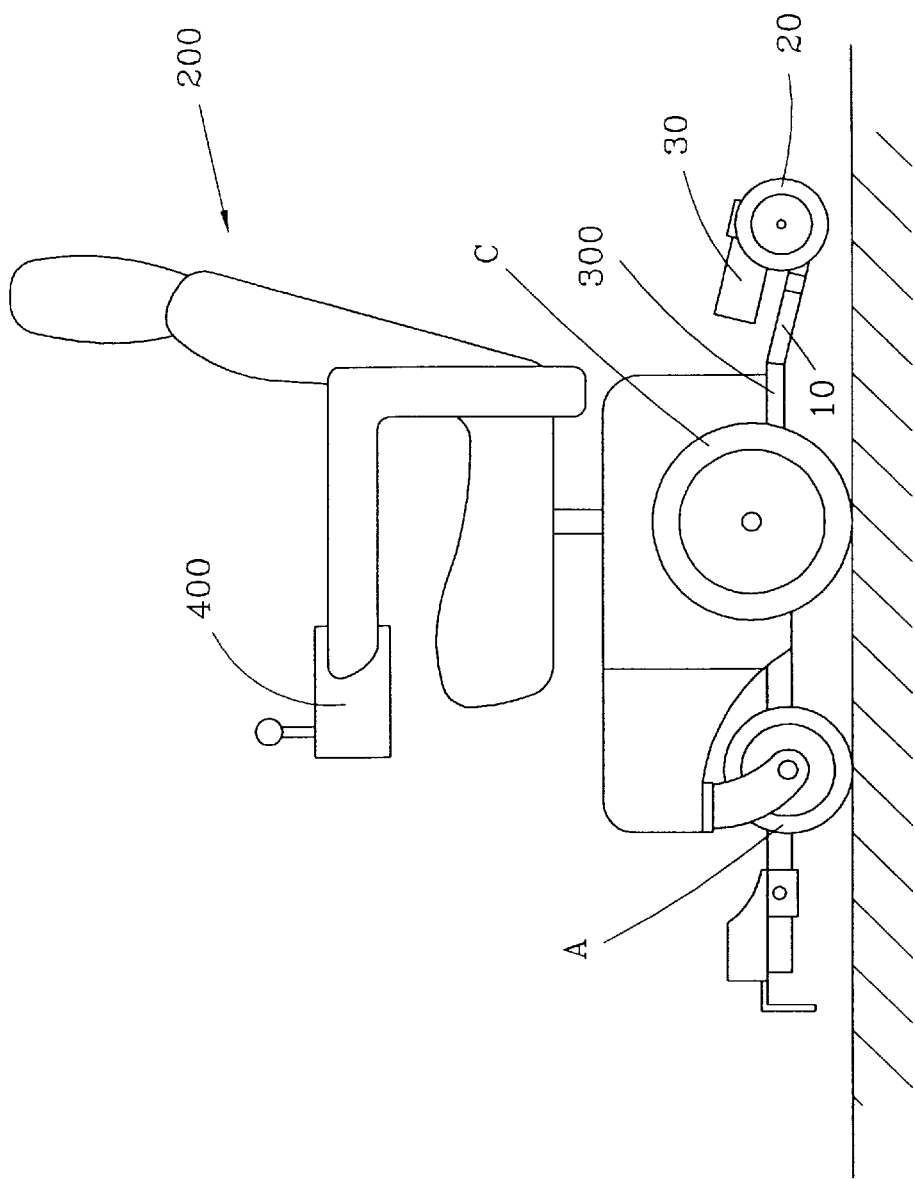
FIG. 7 is a side view of the invalid carriage of FIG. 6.

Please refer to FIGS. 6 and 7 in which a power assist anti-tip wheel system 100 according to the present invention is connected to a rear-wheel drive invalid carriage 200 shown in FIG. 2. The power assist anti-tip wheel system referred to hereinafter shall be generally indicated with the numeral of 100 and includes at least a connecting support 10. The connecting support 10 can be of any suitable configuration. The connecting support 10 as shown in FIGS. 6 and 7 has a middle crossbar and two arms separately extending from two ends of the middle crossbar at a right angle with the crossbar. It is to be understood that the shape of the connecting support 10 described in FIGS. 6 and 7 is only an example thereof and not a limitation thereto. The connecting support 10 is fixedly connected at one end to a predetermined position on a rear side of a main frame 300 at a bottom of the invalid carriage 200. It is to be noted that the connecting support 10 is angularly connected to the main frame 300 so that the whole anti-tip wheel system 100 slightly inclines backward and downward.

There is at least one anti-tip wheel 20 being connected to another end of the connecting support 10. As it can be clearly seen from FIG. 7, the at least one anti-tip wheel 20 is located at a position higher than that of pilot wheels A and drive wheels C of the invalid carriage 200, such that it does not always touch a road or ground surface.

There is also at least one power driving means 30 connected to the connecting support 10 and including a motor and a gear transmission mechanism (not shown) to rotate the assist anti-tip wheel 20. The power driving means 30 can be switched on and off automatically or manually. In the case of automatical switching on and off of the power driving means 30, a control circuit (which is not in the scope of the present invention and is therefore not described in details herein) is provided to sense a suspension and idle state of the drive wheels C of the invalid carriage 200 and thereby switches on the power driving means 30. In the case of manual switching on and off of the power driving means 30, a push button or similar switch is additionally provided on a rocker 400 on the invalid carriage 200 for controlling the drive wheels C, so as to switch on or off the at least one power driving means 30.

Figure 8:
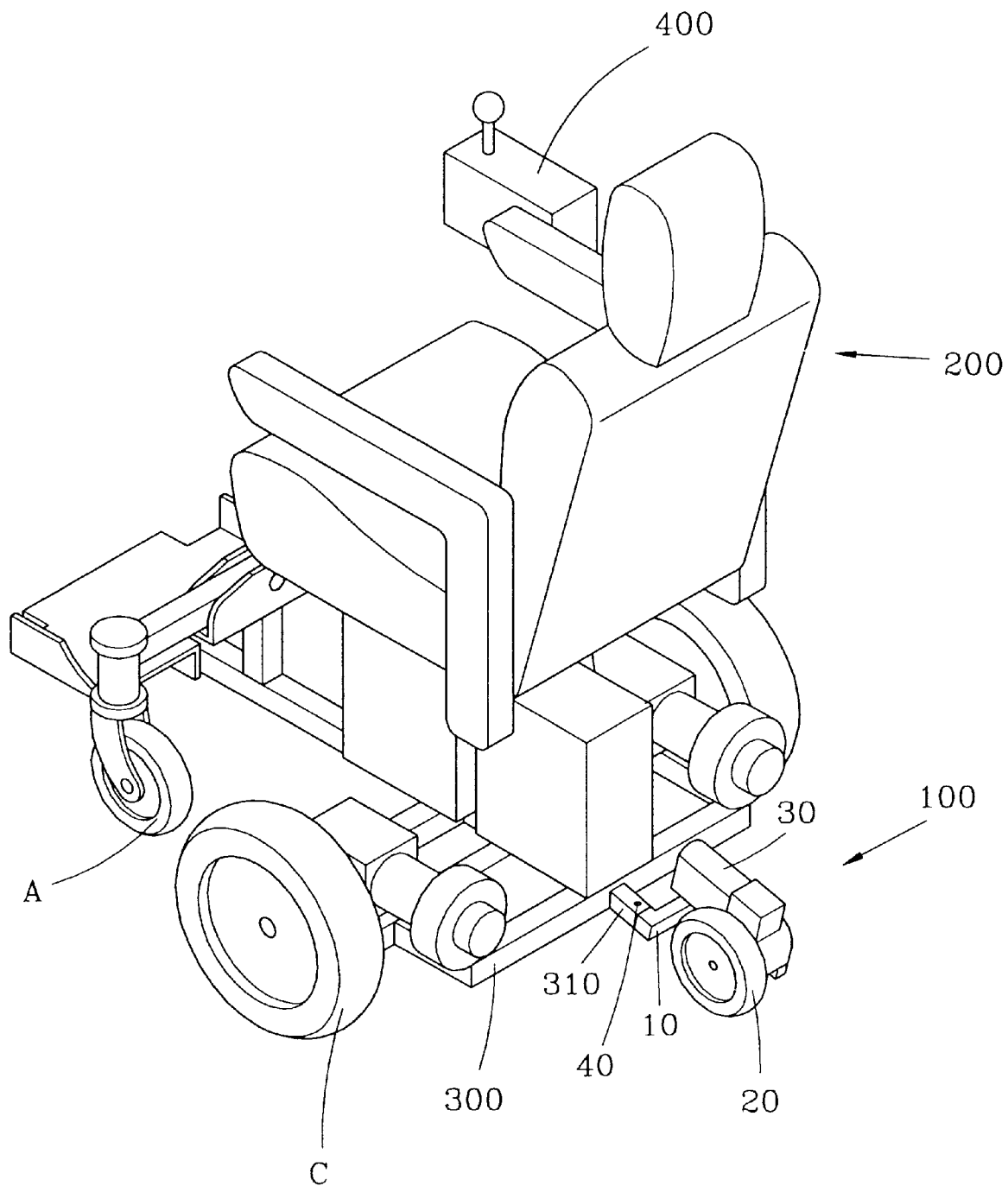
FIG. 8 is similar to FIG. 6 but with the power assist anti-tip wheel system detachably connected to the rear end of the invalid carriage.
Figure 9:
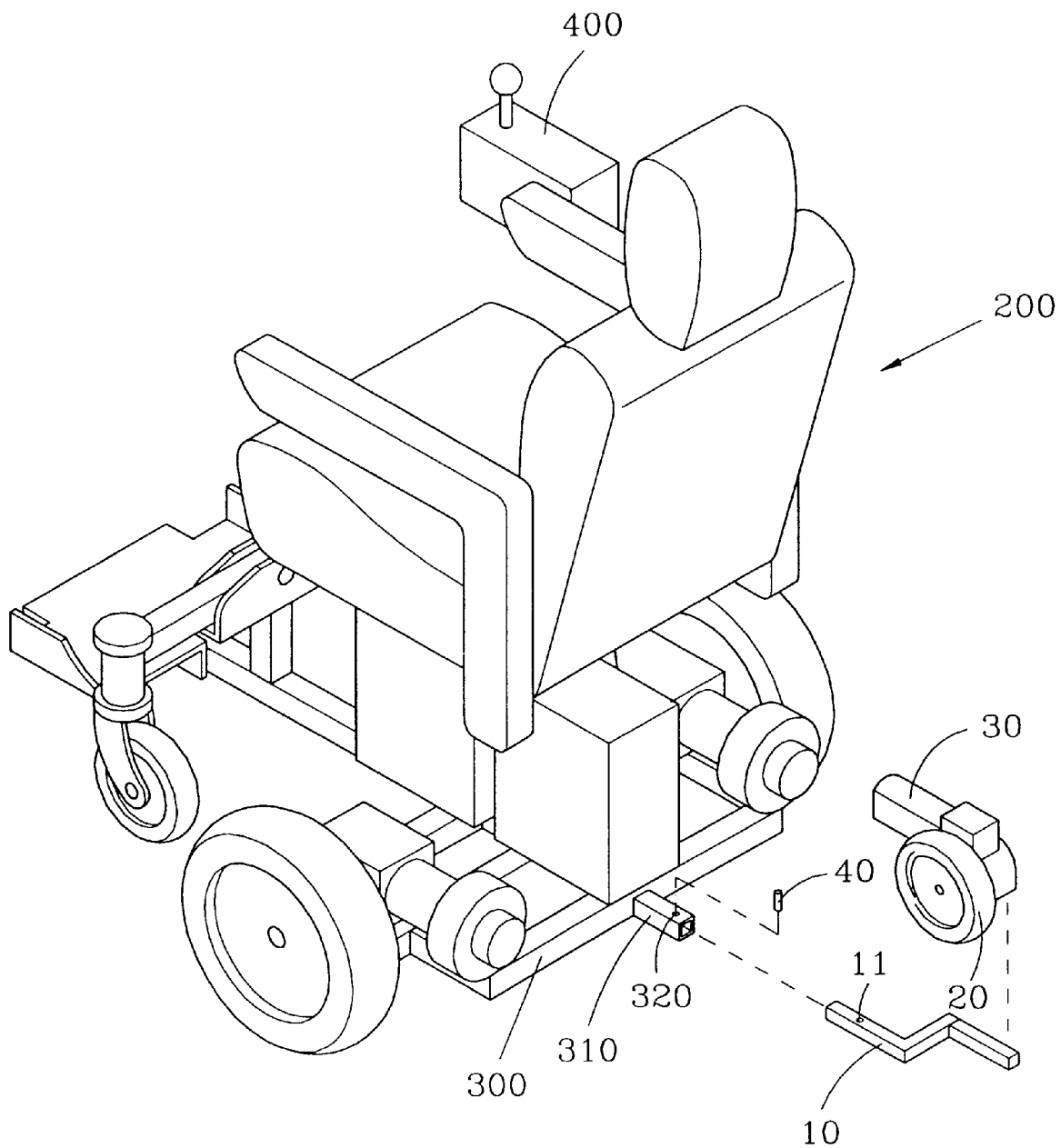
FIG. 9 is a partially exploded perspective showing the manner in which the power assist anti-tip wheel system of FIG. 8 is connected to the invalid carriage.
Figure 10:
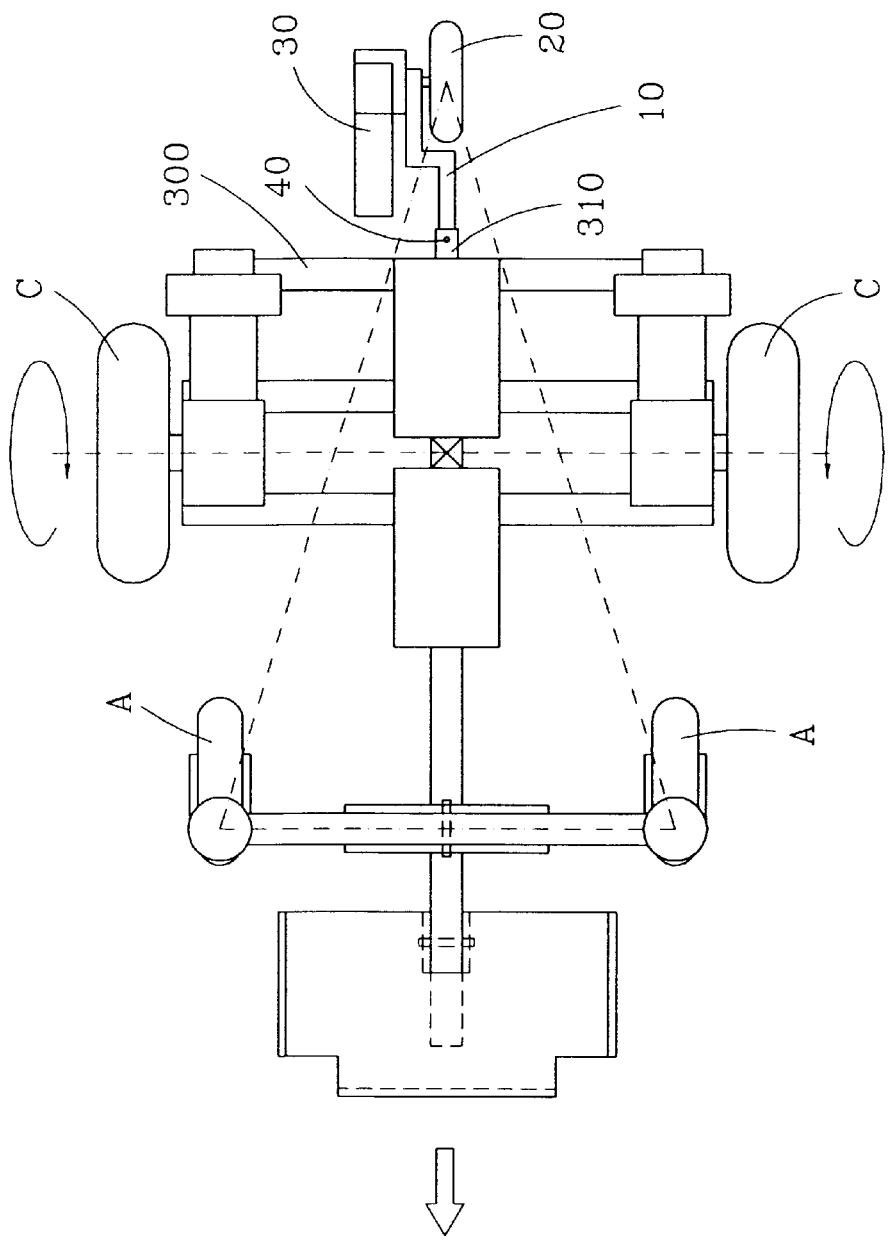
FIG. 10 is a top view of the whole invalid carriage of FIG. 8.

Please now refer to FIGS. 8 to 10. The at least one connecting support 10 of the power assist anti-tip wheel system 100 shown in FIGS. 6 and 7 may also be detachably connected to the main frame 300 of the invalid carriage 200. In this case, the end of the connecting support 10 connected to the main frame 300 is provided with a hole 11. And, the main frame 300 has a hollow connecting section 310 backward extending from the rear side of the main frame 300. As shown in FIG. 9, the connecting section 310 is provided with an insertion hole 320 corresponding to the hole 11 on the connecting support 10 when the connecting support 10 is inserted into the hollow connecting section 310. An insertion pin 40 can be inserted through the insertion hole 320 and the hole 11 to detachably lock the connecting support 10 to the connecting section 310 of the main frame 300. That is, the power assist anti-tip wheel system 100 of the present invention can be connected to or removed from the invalid carriage 200 at any time. As shown in FIG. 10 by the broken line, the anti-tip wheel 20 connected to the invalid carriage 200 and the front pilot wheels A of the invalid carriage 200 together constitute three supporting points of an assistant power transmission structure.

Figure 11:
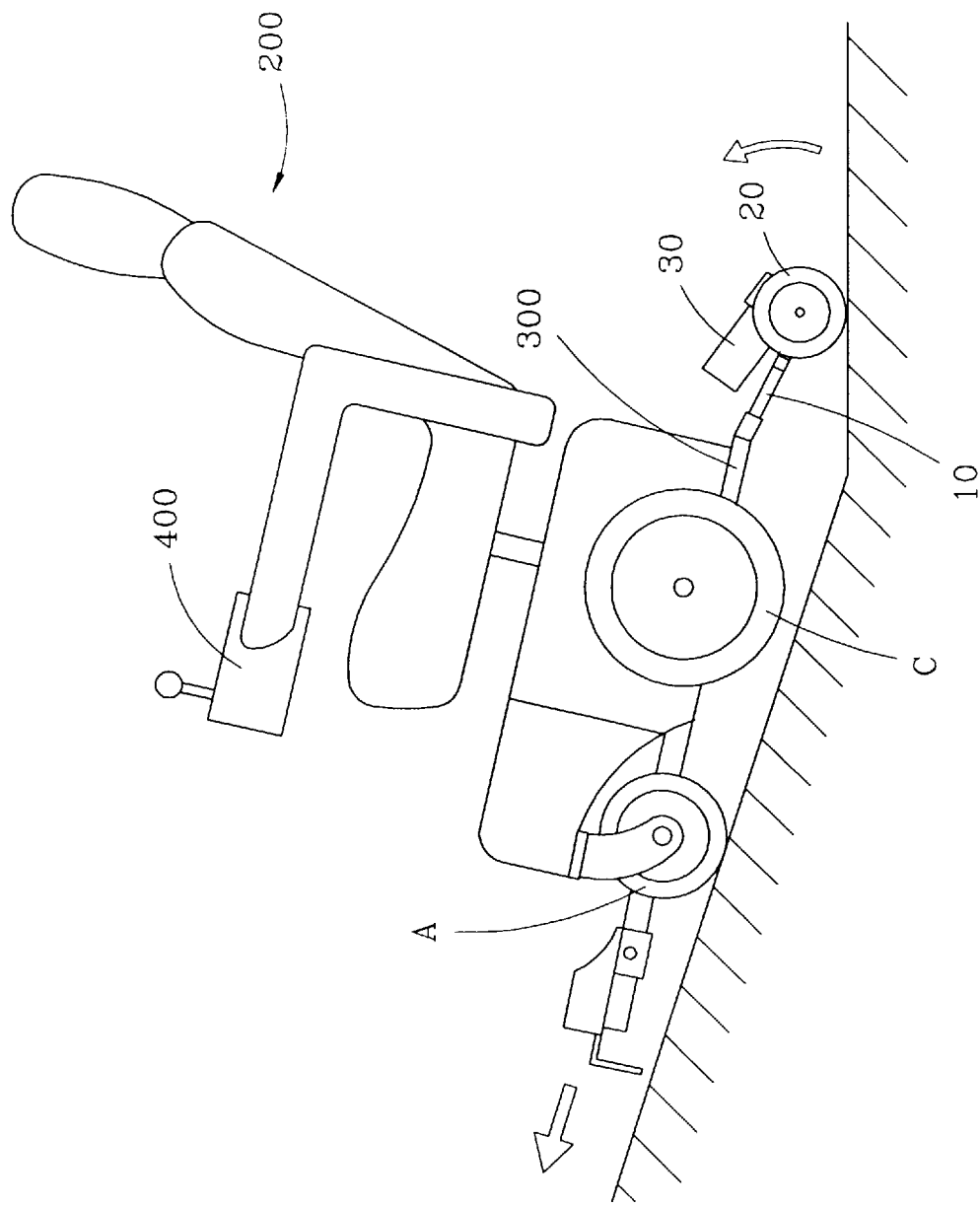
FIG. 11 is a side view showing the invalid carriage with the power assist anti-tip wheel system of FIG. 6 or FIG. 8 moving onto a slope.
Figure 12:
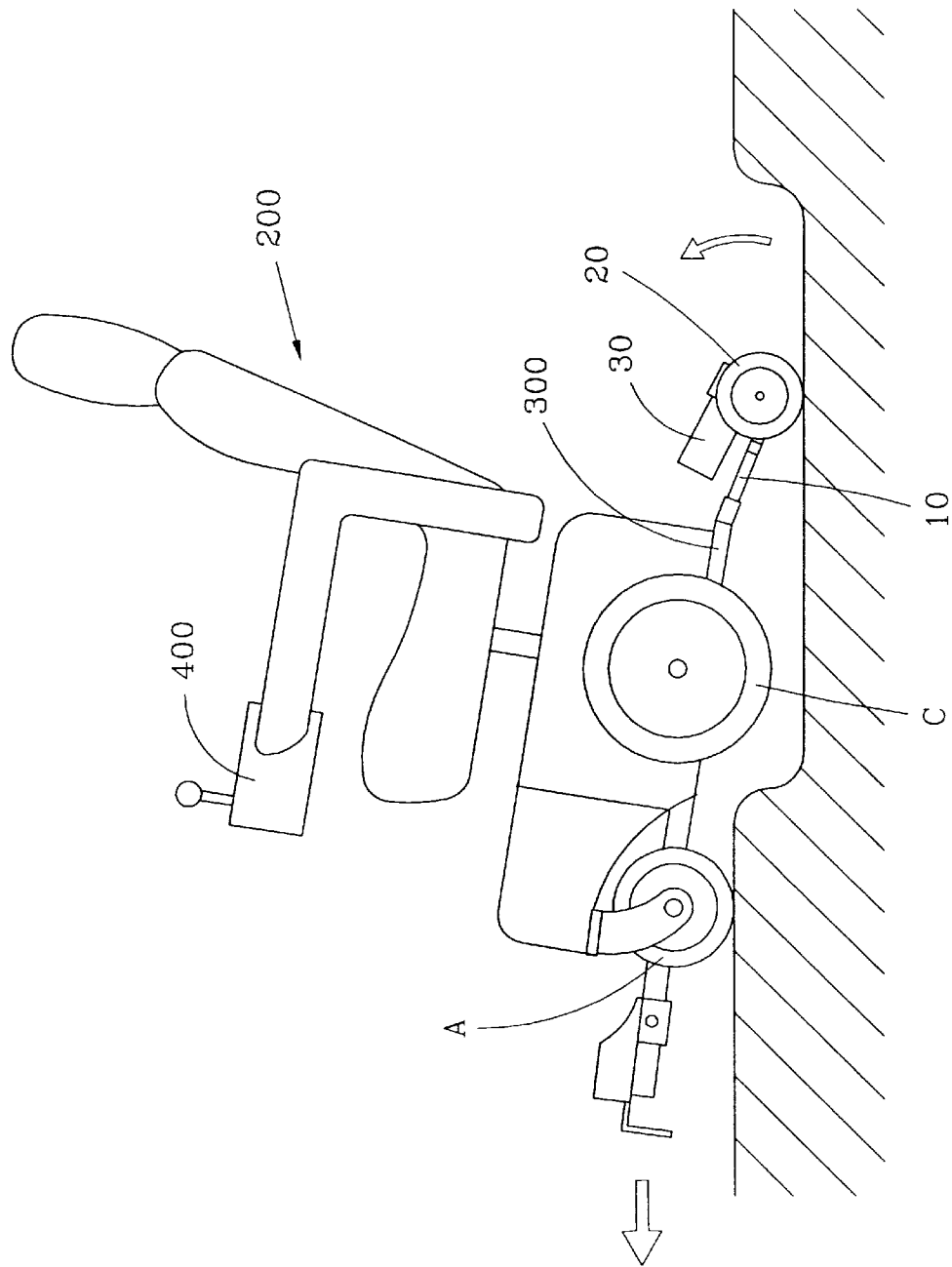
FIG. 12 is a side view showing the invalid carriage with the power assist anti-tip wheel system of FIG. 6 or 8 passing over a recess on a road surface.
Figure 13:
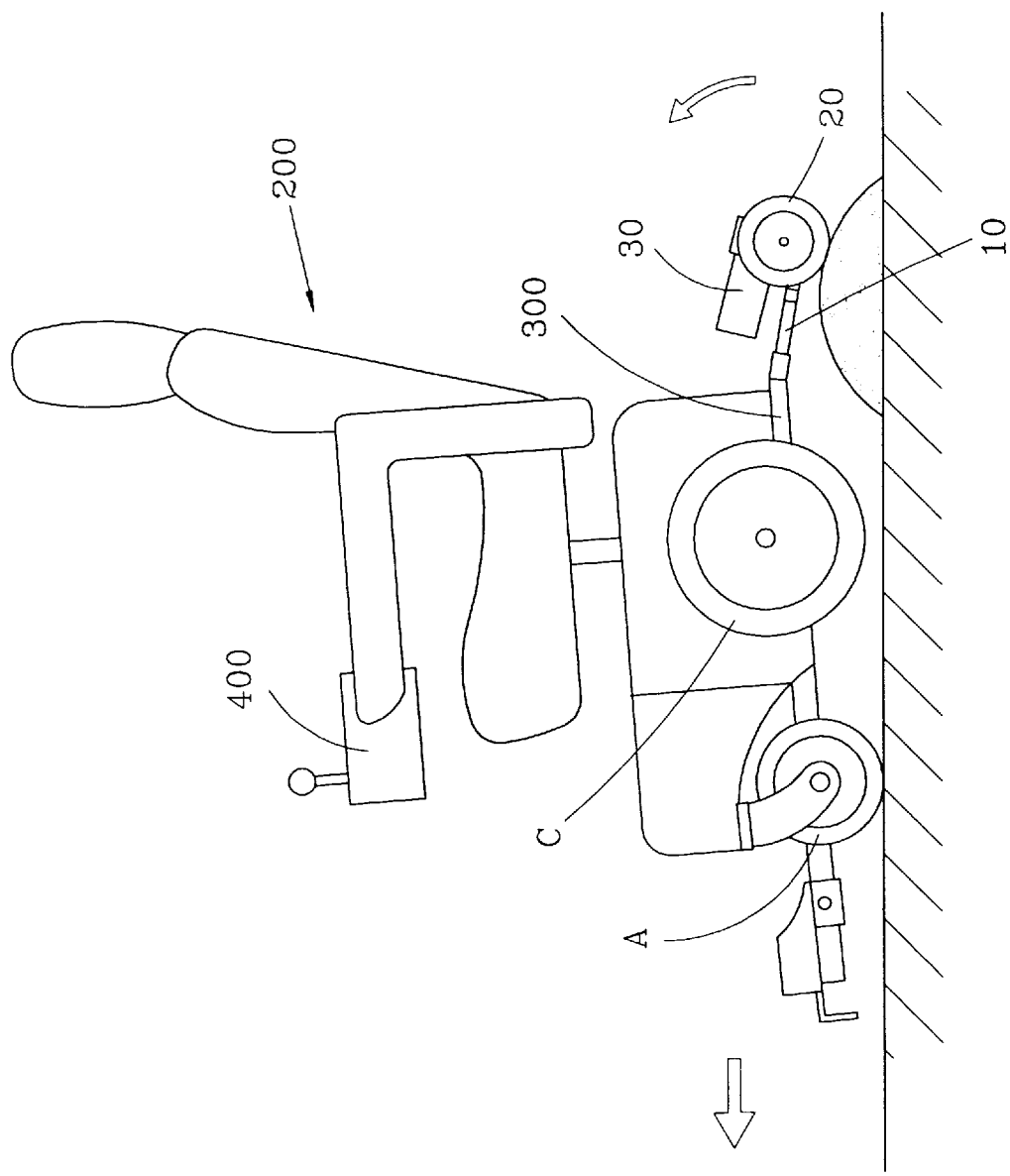
FIG. 13 is a side view showing the invalid carriage with the power assist anti-tip wheel system of FIG. 6 or 8 passing across a bulge on the road surface.

FIGS. 11 to 13 illustrate the invalid carriage 200 equipped with the power assist anti-tip wheel system 100 shown in FIGS. 6 to 10 being operated to travel onto a slope, over a recess, and across a bulge, respectively. As shown, when the invalid carriage 200 passes such irregularities on the road surface, the drive wheels C thereof might very possible become suspended and idling and fail to cause the invalid carriage 200 to move any further. At this point, the power driving means 30 can be automatically or manually actuated to supply power to the at least one anti-tip wheel 20 and to rotate the same. The at least one anti-tip wheel 20 being rotated by the power driving means 30 shall be able to move and help the invalid carriage 200 to enter a four-wheel transmission condition and to travel forward again. At this point, the suspended drive wheels C may quickly leave their suspended and idling state to contact with the road surface again and causes the invalid carriage 200 to move forward in a normal, smooth, and safe manner again.

Figure 14:
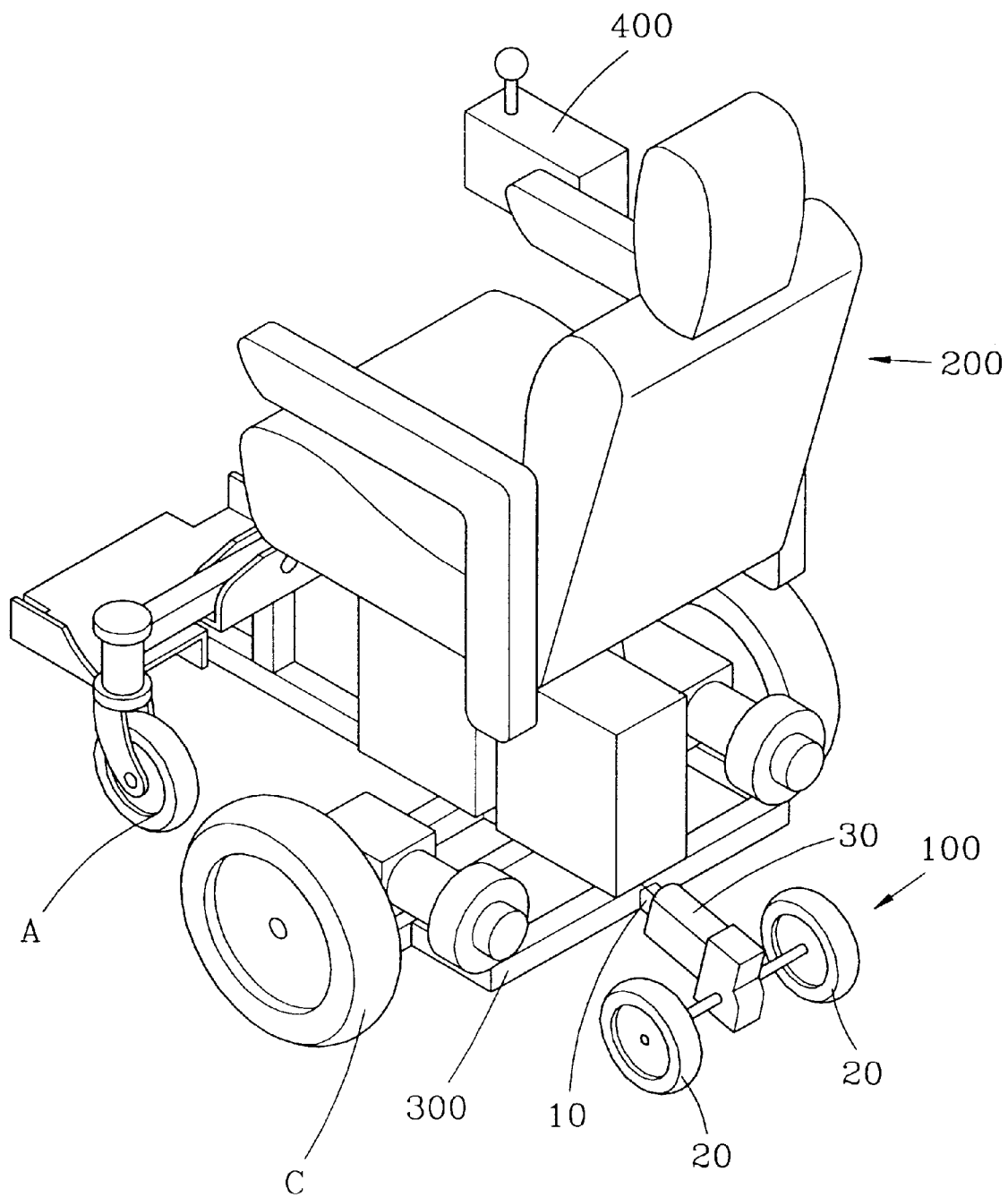
FIG. 14 is a perspective showing an invalid carriage with a second embodiment of the power assist anti-tip wheel system according to the present invention fixedly connected to the rear end of the invalid carriage.
Figure 15:
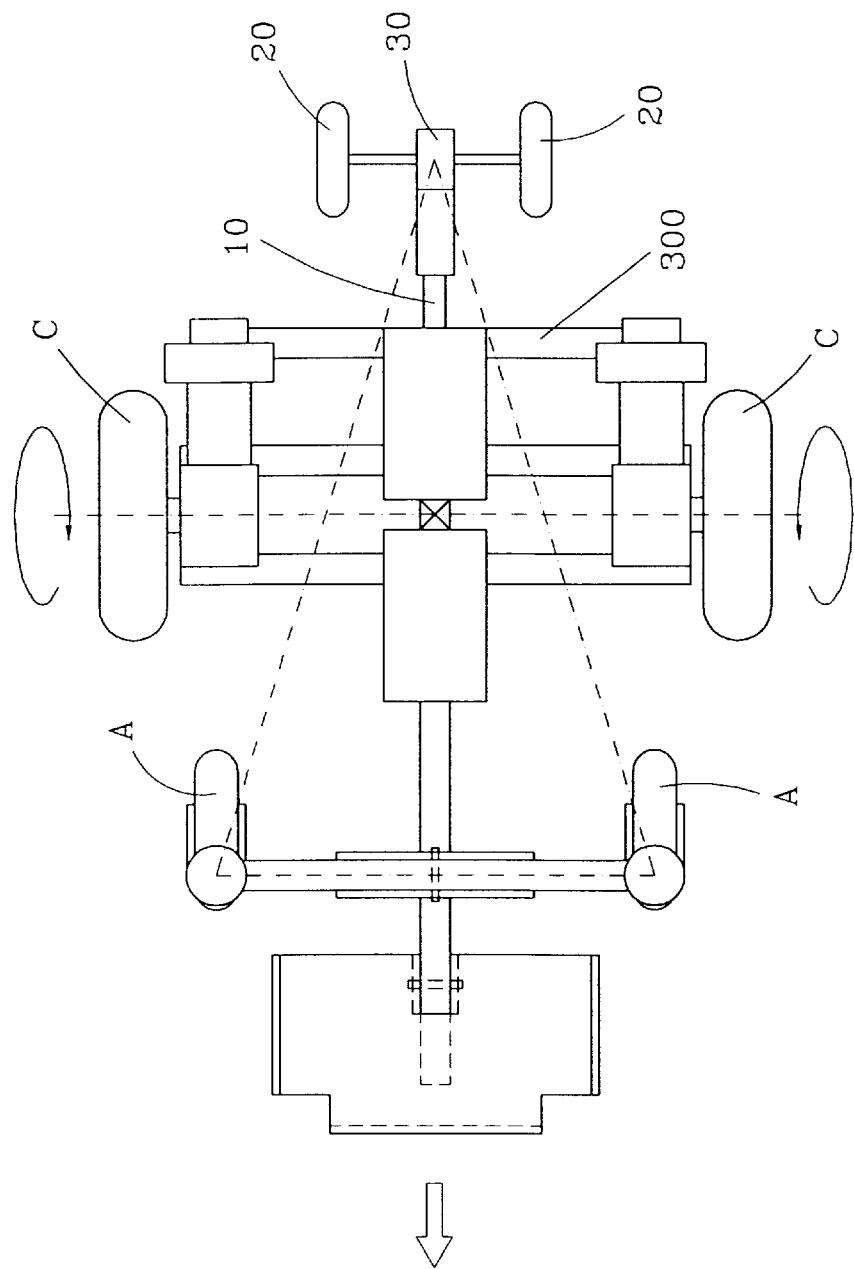
FIG. 15 is a top view of FIG. 14.
Figure 16:
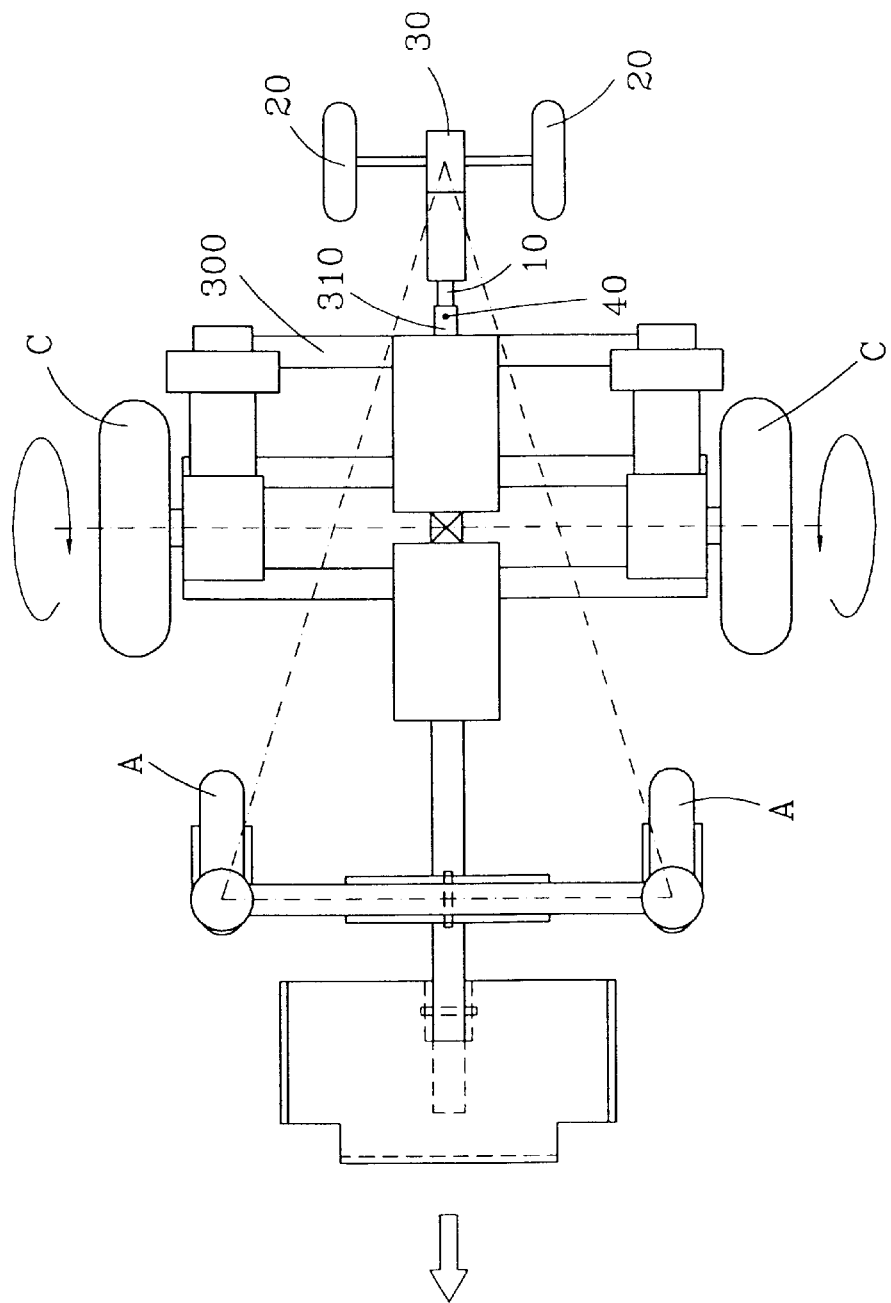
FIG. 16 is similar to FIG. 15 but with the power assist anti-tip wheel system of FIG. 14 detachably connected to the rear end of the invalid carriage.

FIGS. 14 to 16 illustrate a second embodiment of the present invention. In this second embodiment, the power assist anti-tip wheel system 100 has a connecting support 10 which is substantially a straight bar-like member and two assist anti-tip wheels 20 separately connected to each ide of the connecting support 10. These two anti-tip wheels 20 use the same power driving means 30 as their common power source to drive them to rotate. As shown in FIG. 15, the supporting point of power assist anti-tip wheel system 100 together with the front pilot wheels A to form a triangular assist power driving structure with three supporting points, similar to that provided in the first embodiment of the present invention. The straight bar-like connecting support 10 in this second embodiment may be fixedly connected to the main frame 300 of the invalid carriage 200 as shown in FIG. 14, or, as shown in FIG. 6, be detachably connected to a connecting section 310 of the main frame 300 by means of an insertion pin 40, in a manner similar to that shown in FIGS. 8 to 10.

Figure 17:
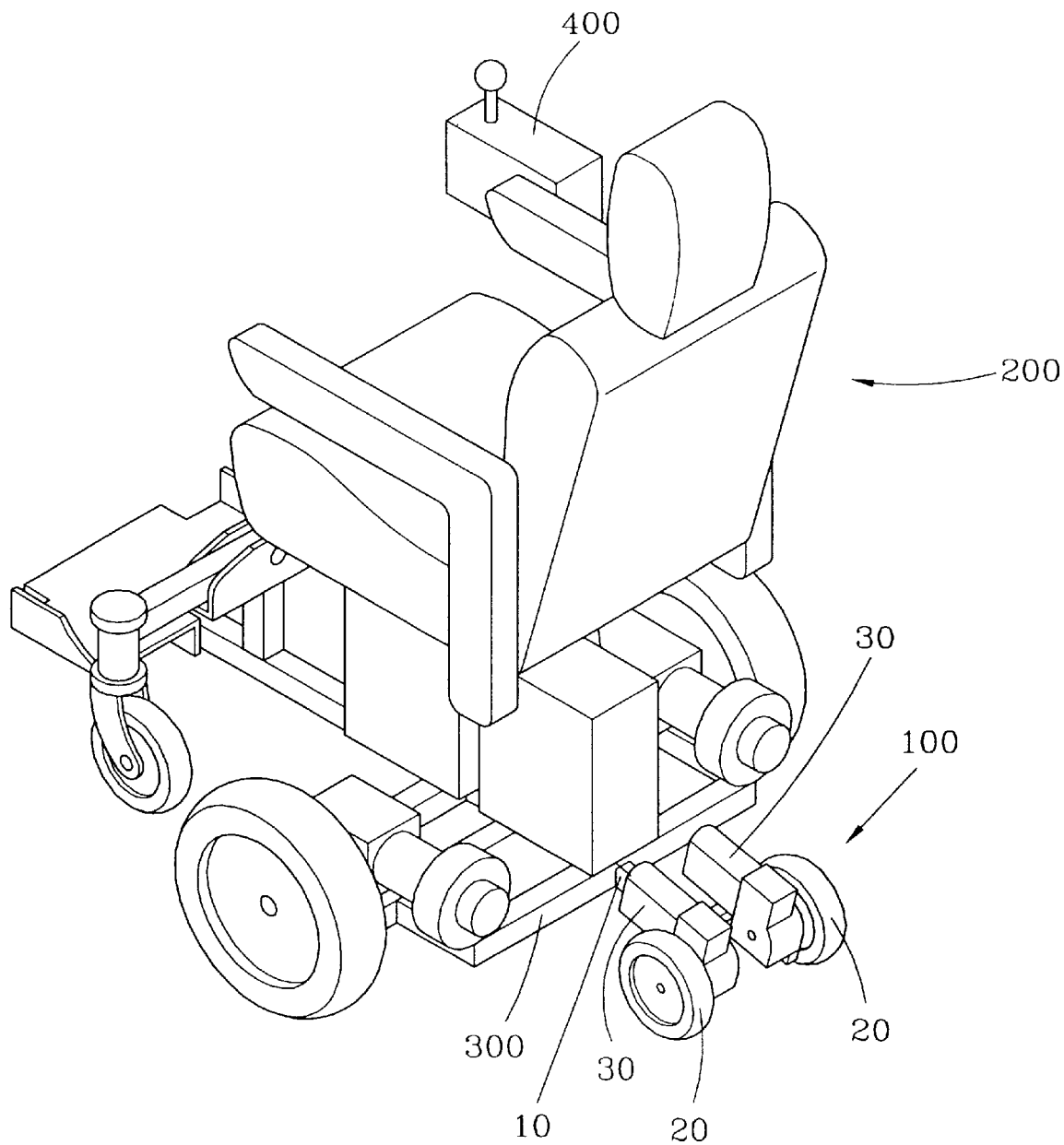
FIG. 17 is a perspective showing an invalid carriage with a third embodiment of the power assist anti-tip wheel system according to the present invention fixedly connected to the rear end of the invalid carriage.
Figure 18:
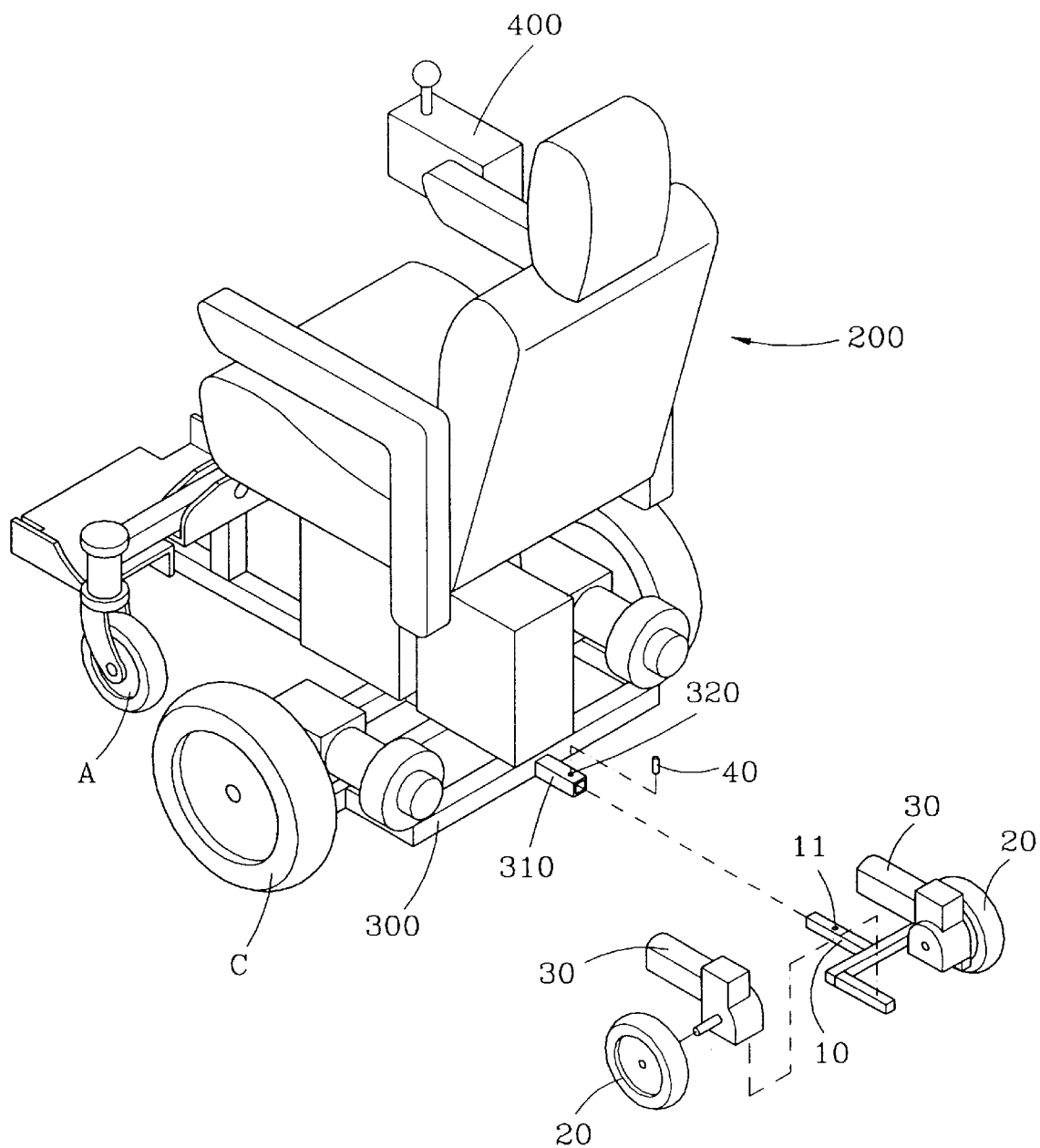
FIG. 18 is a partially exploded perspective showing the manner in which the power assist anti-tip wheel system of FIG. 17 is detachably connected to the invalid carriage.
Figure 19:
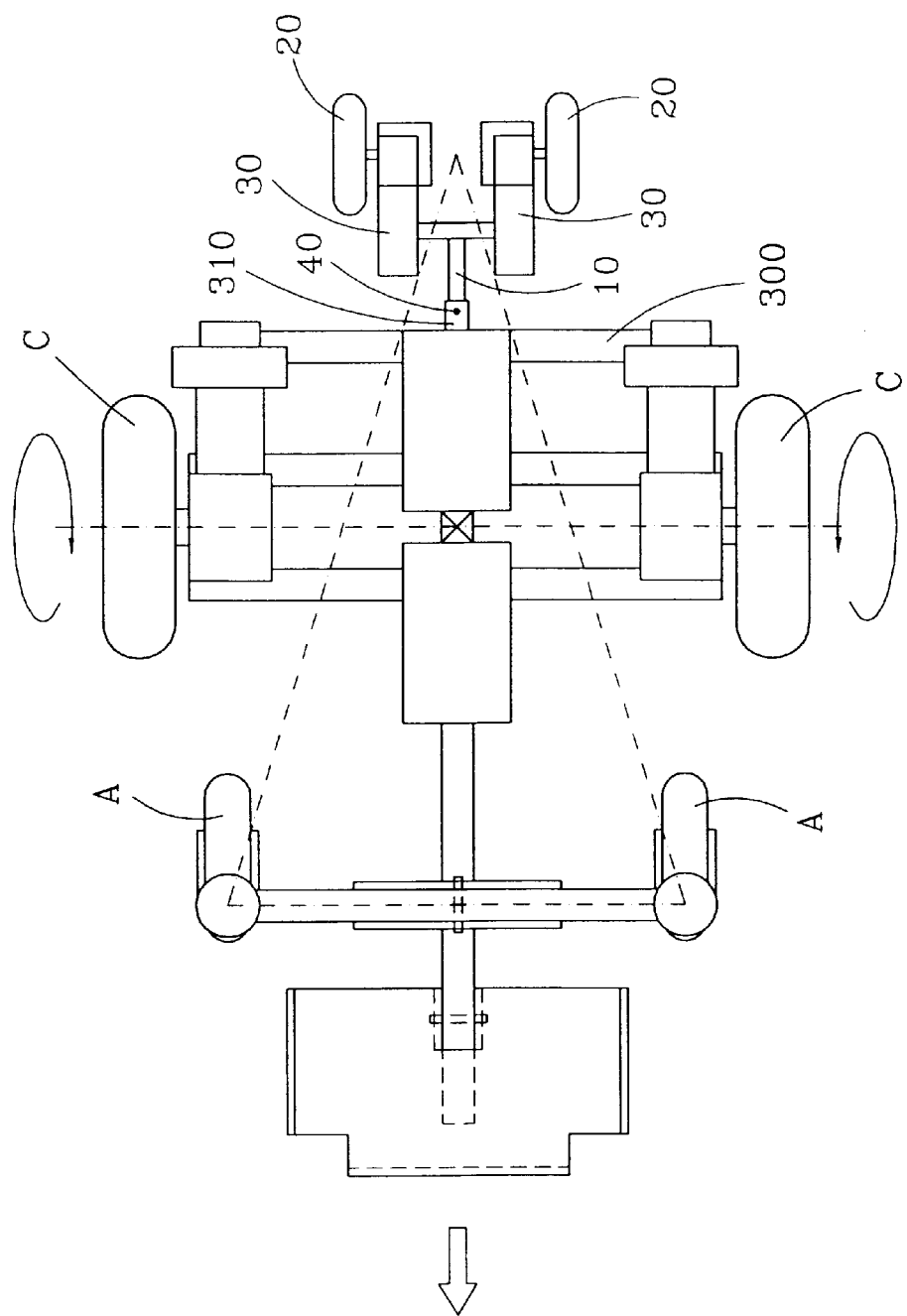
FIG. 19 is a top view of FIG. 17.

FIGS. 17 to 19 illustrate a third embodiment of the present invention. In this third embodiment, the power assist anti-tip wheel system 100 has a connecting support 10 which is substantially a T-shaped member including a longitudinal and a transverse portion. A free end of the longitudinal portion of the T-shaped connecting support 10 is connected to the main frame 300 of the invalid carriage 200. A pair of assist anti-tip wheels 20 are connected to two ends of the transverse portion of the T-shaped connecting support 10. Each of the assist anti-tip wheels 20 is equipped with a separate power driving means 30, making the power assist anti-tip wheel system 100 in this support 10 in this embodiment may be fixedly connected to the main frame 300 of the invalid carriage 200 as shown in FIG. 17, or, as shown in FIGS. 18 and 19, be detachably connected to a connecting section 310 of the main frame 300 by means of an insertion pin 40, in a manner similar to that shown in FIGS. 8 to 10.

Figure 20:
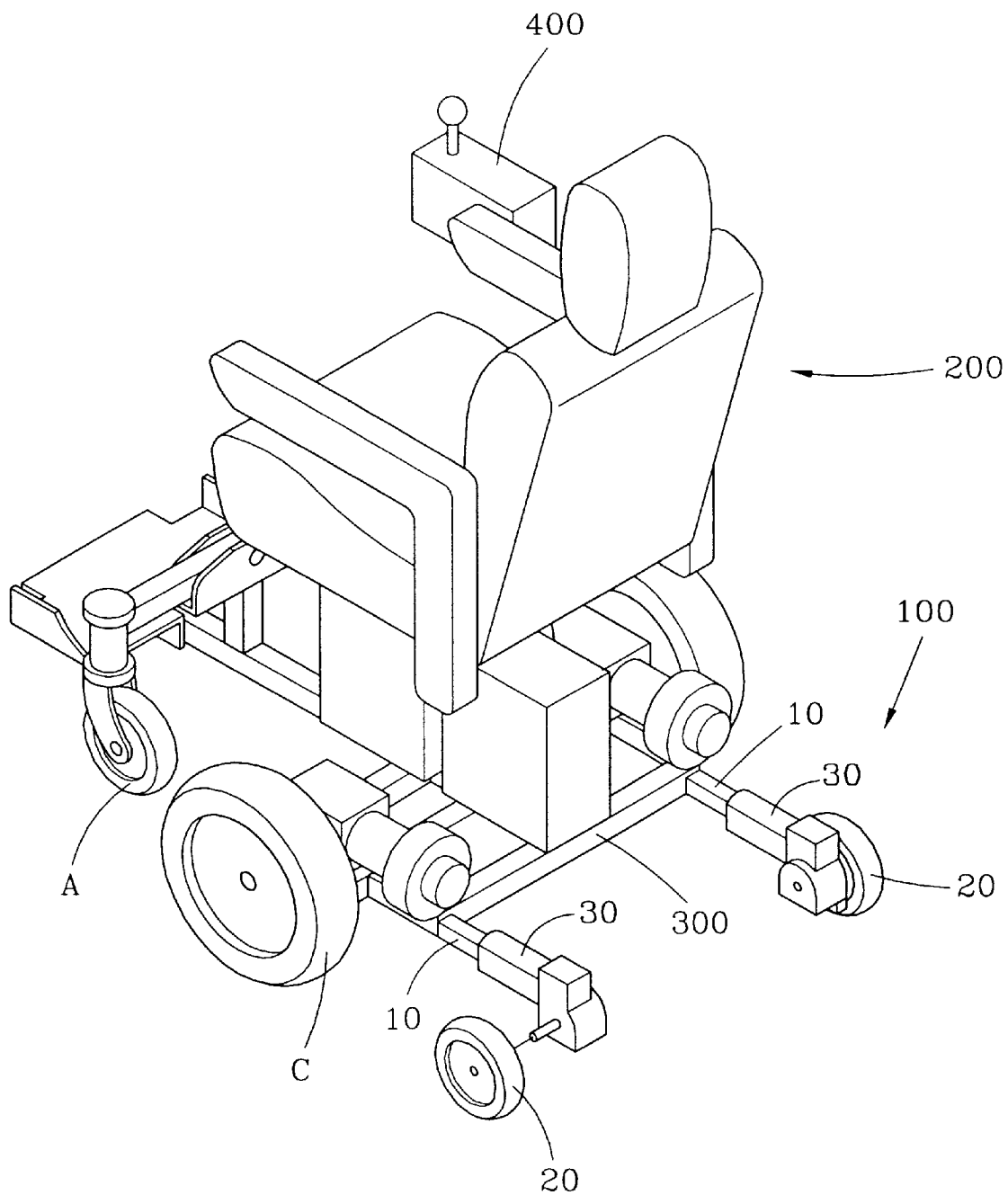
FIG. 20 is a perspective showing an invalid carriage with a fourth embodiment of the power assist anti-tip wheel system according to the present invention fixedly connected to the rear end of the invalid carriage.
Figure 21:
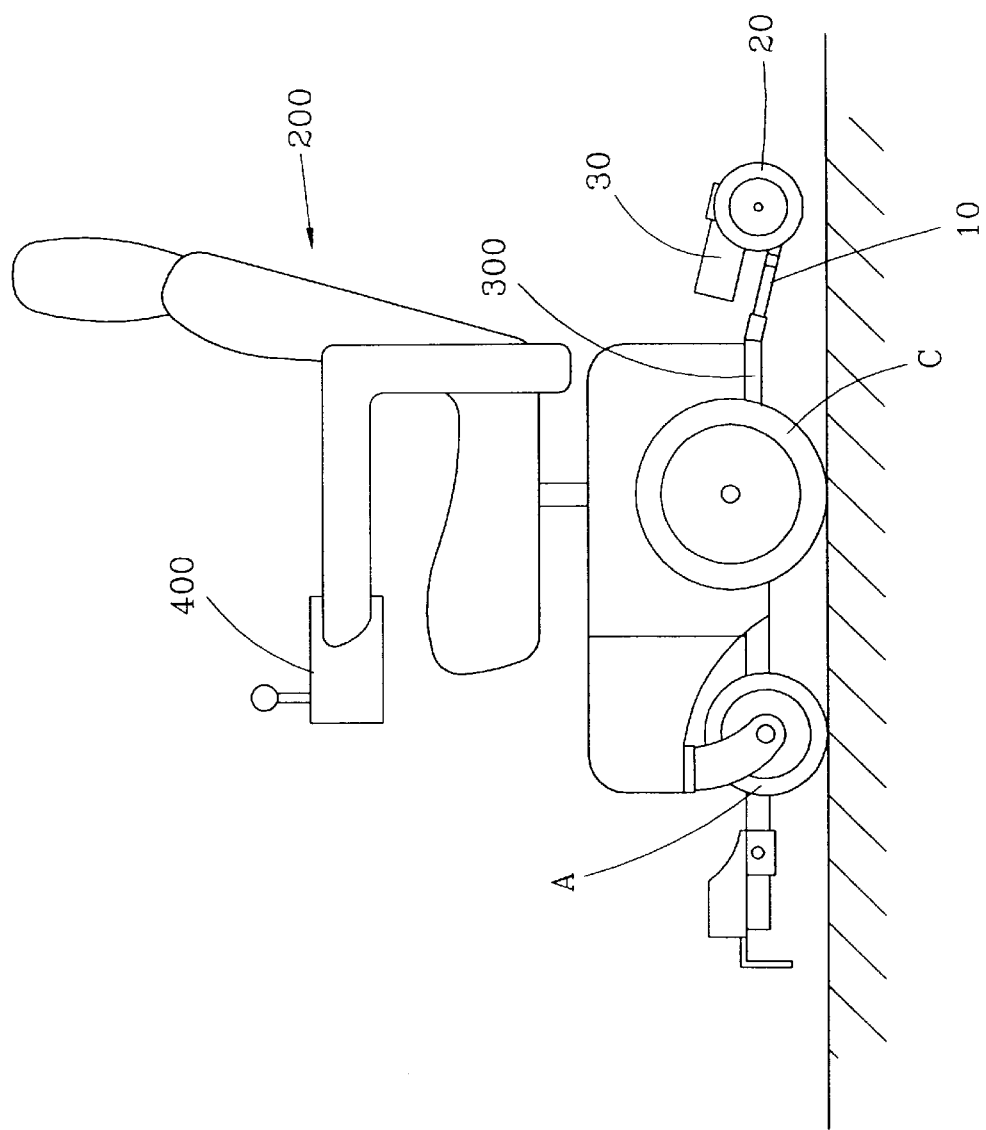
FIG. 21 is a side view of FIG. 20.
Figure 22:
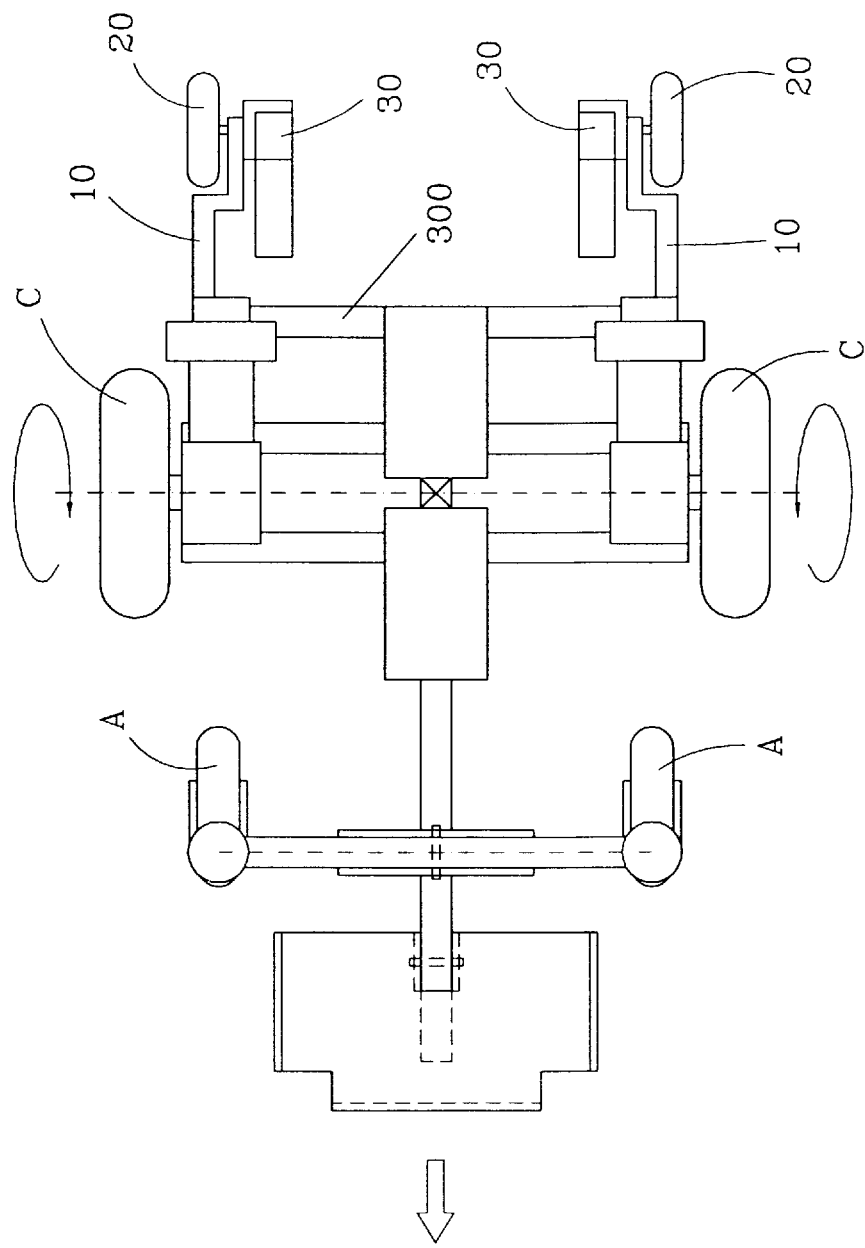
FIG. 22 is a top view of FIG. 20.

FIGS. 20 to 22 illustrate a fourth embodiment of the present invention. In this fourth embodiment, the power assist anti-tip wheel system 100 includes two straight bar-like connecting supports 10 separately fixedly connected at one end to a left and a right end of the rear side of the main frame 300 of the invalid carriage 200. Each of the straight bar-like connecting supports 10 is connected at another end with an assist anti-tip wheel 20 and a power driving means 30, so that the two assist anti-tip wheels 20 can be driven to rotate by their respective power driving means 30.

Figure 23:
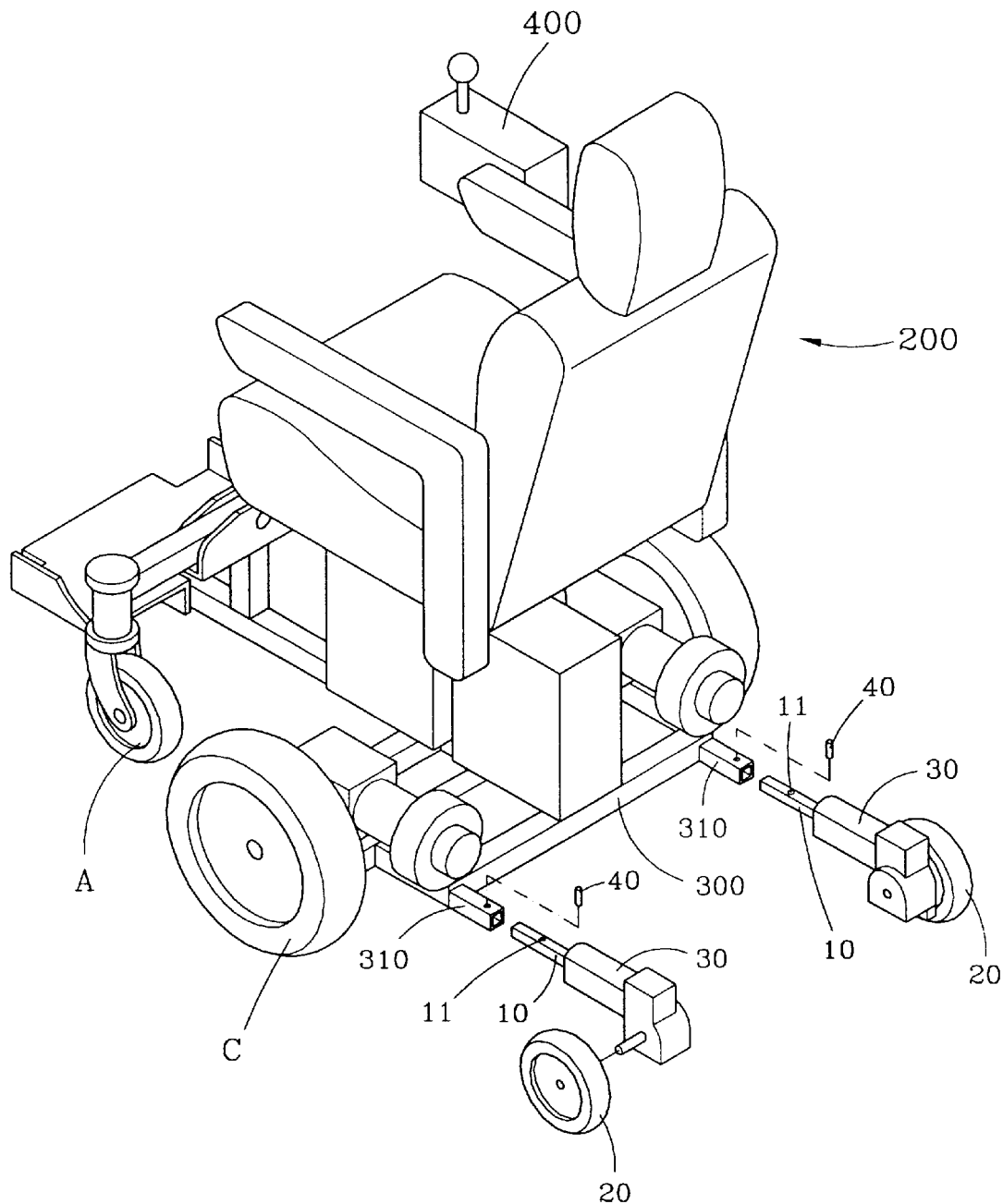
FIG. 23 is a partially exploded perspective showing the manner in which the power assist anti-tip wheel system of FIG. 20 is detachably connected to the invalid carriage.
Figure 24:
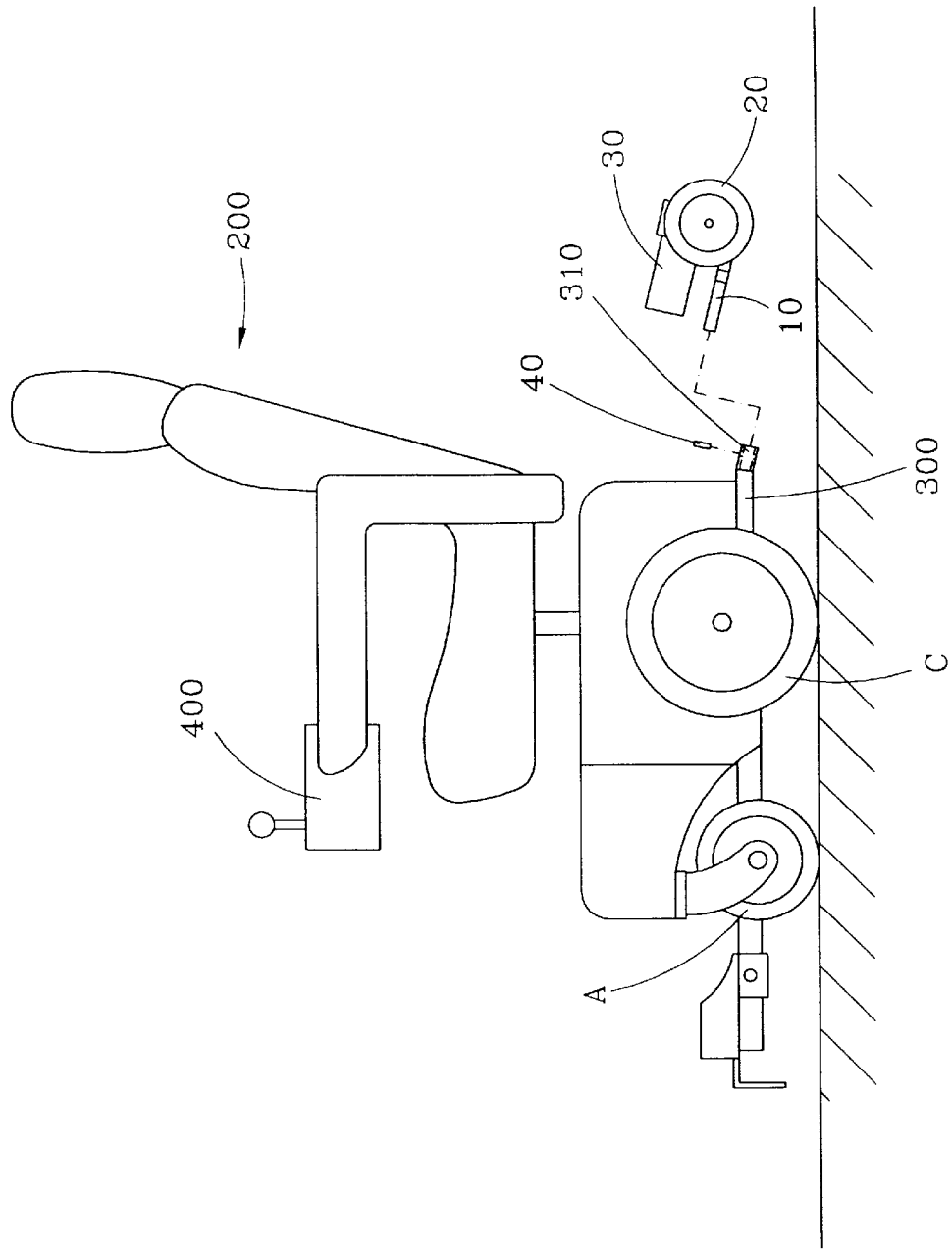
FIG. 24 is a side view of FIG. 23.
Figure 25:
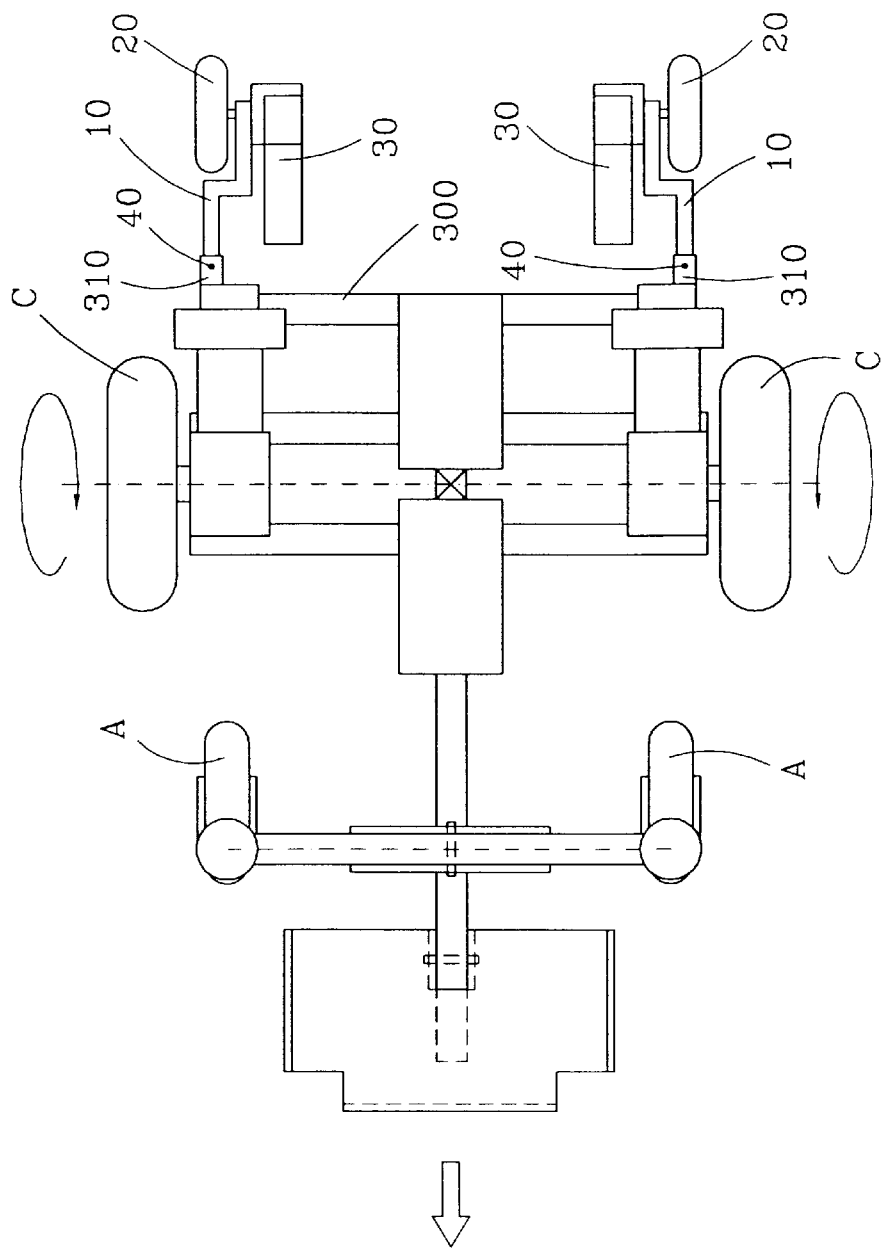
FIG. 25 is a top view of FIG. 23.
Figure 26:
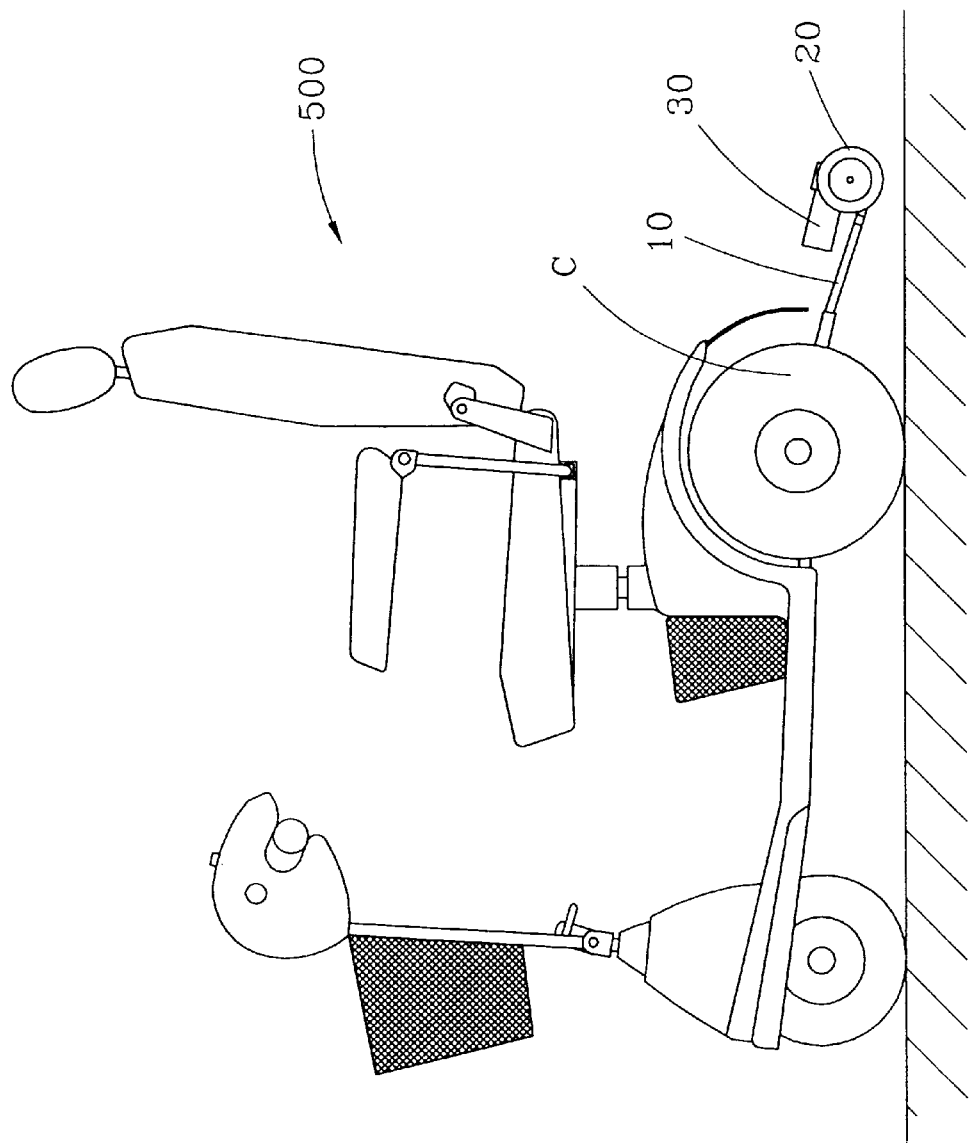
FIG. 26 is a view showing the first embodiment of the present invention being used with a motorized three-wheel invalid vehicle.

FIGS. 23 to 25 illustrate an alternative manner for the two connecting supports 10 of the power assist anti-tip wheel system 100 of FIG. 20 to connect to the main frame 300 of the invalid carriage 200. Similar to the manner as shown in FIG. 8, insertion pins 40 are used to detachably lock the connecting supports 10 to the main frame 300, so that the power assist anti-tip wheel system 100 can be freely connected to or removed from the invalid carriage 200 at any time. Meanwhile, the drive wheels C and the assist anti-tip wheels 20 together form a four-wheel transmission power assist drive structure, as shown in FIG. 25.

Figure 27:
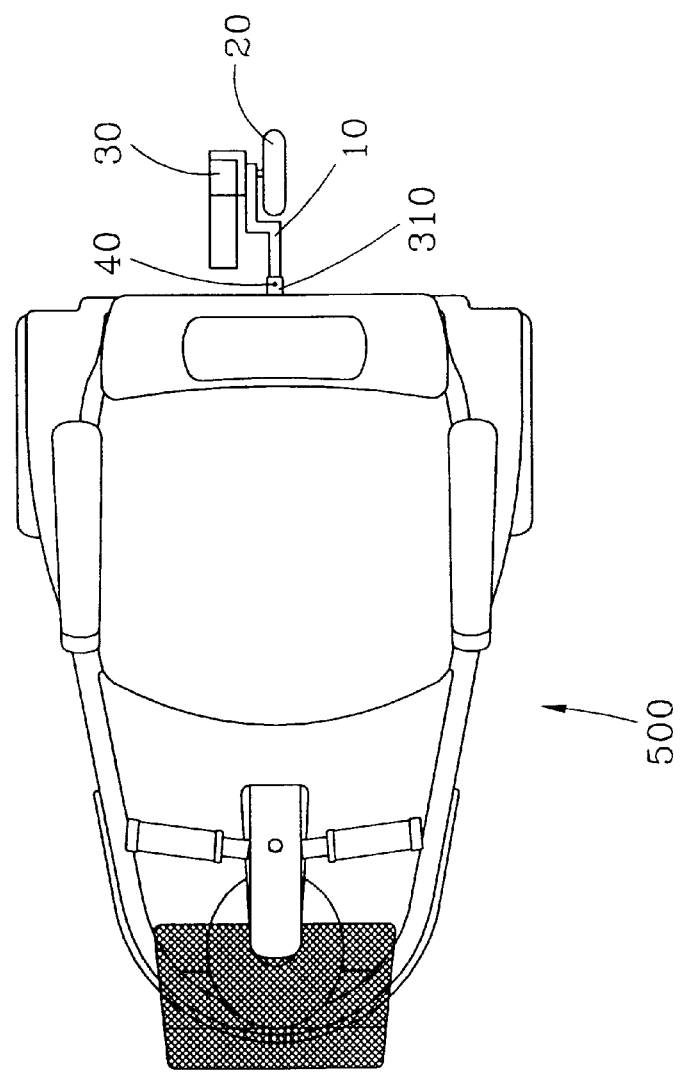
FIG. 27 is a top view of FIG. 26.
Figure 28:
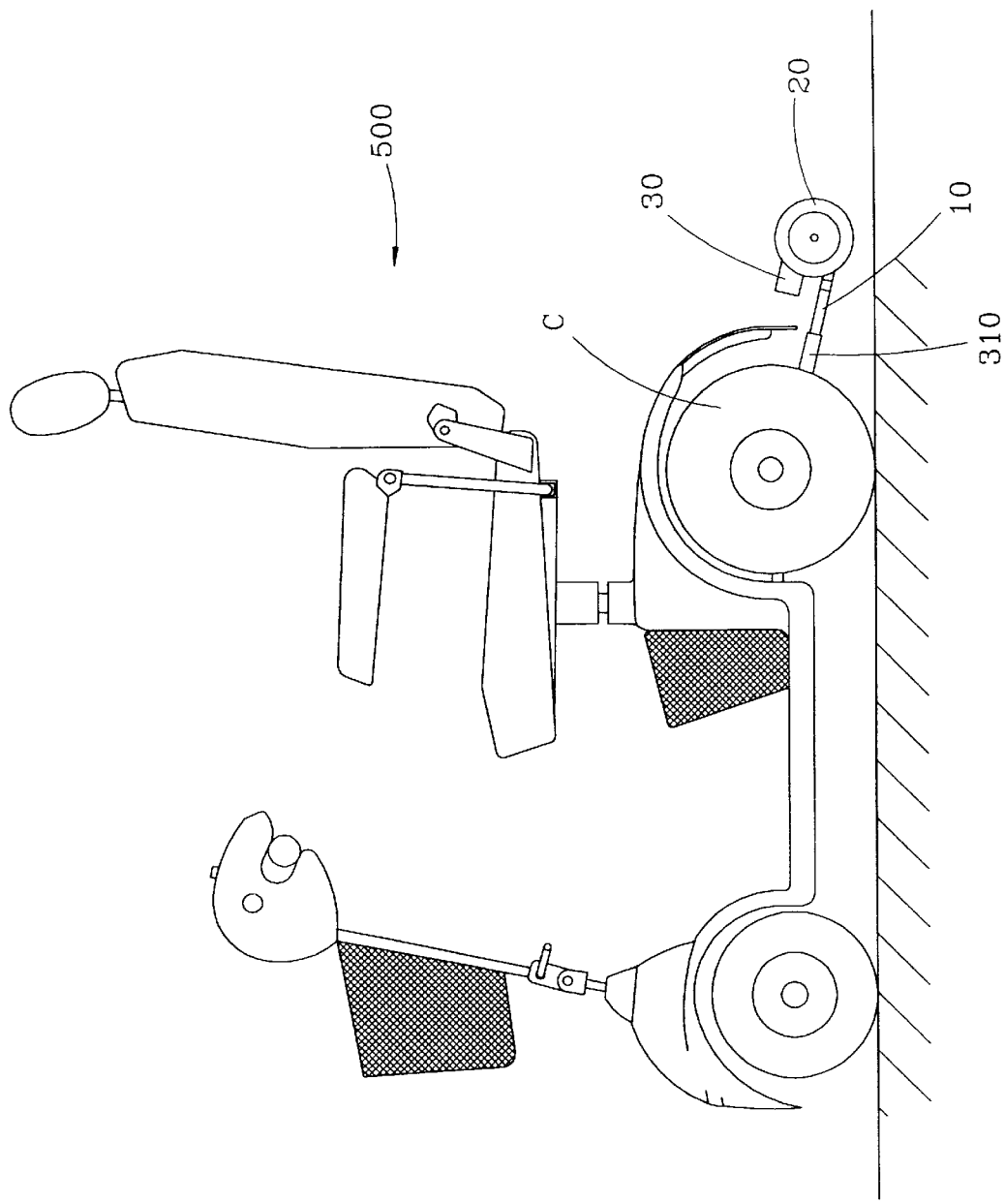
FIG. 28 is a view showing the first embodiment of the present invention being used with a motorized four-wheel invalid vehicle.
Figure 29:
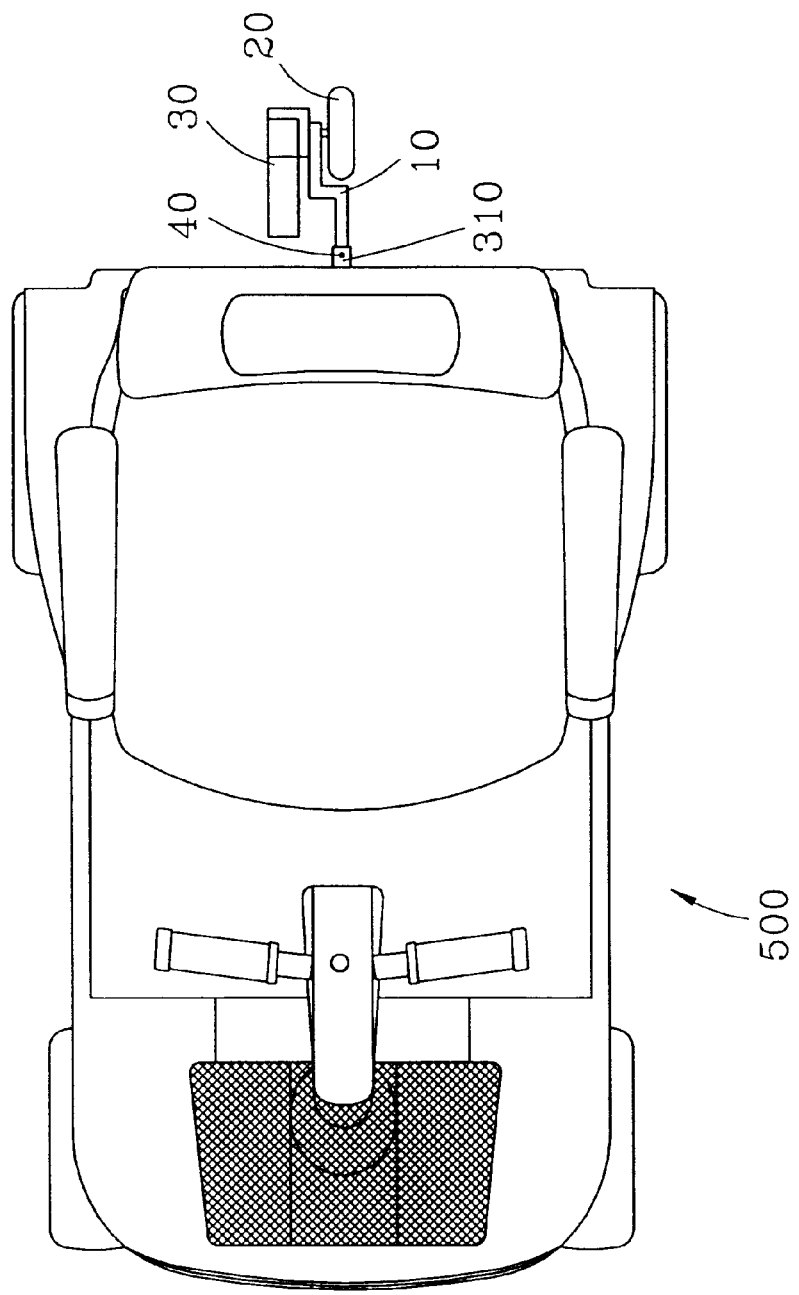
FIG. 29 is a top view of FIG. 28.
Figure 30:
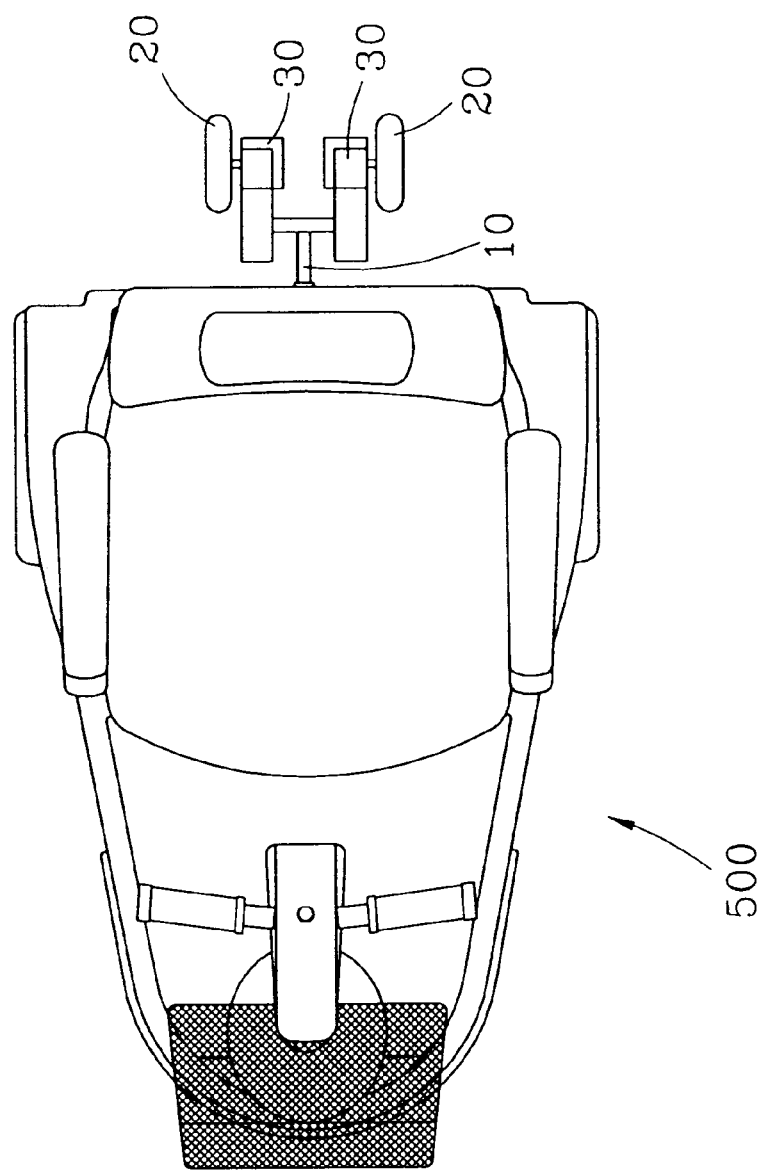
FIG. 30 is a top view showing the third embodiment of the present invention in FIG. 17 being used with a motorized three-wheel invalid vehicle.
Figure 31:
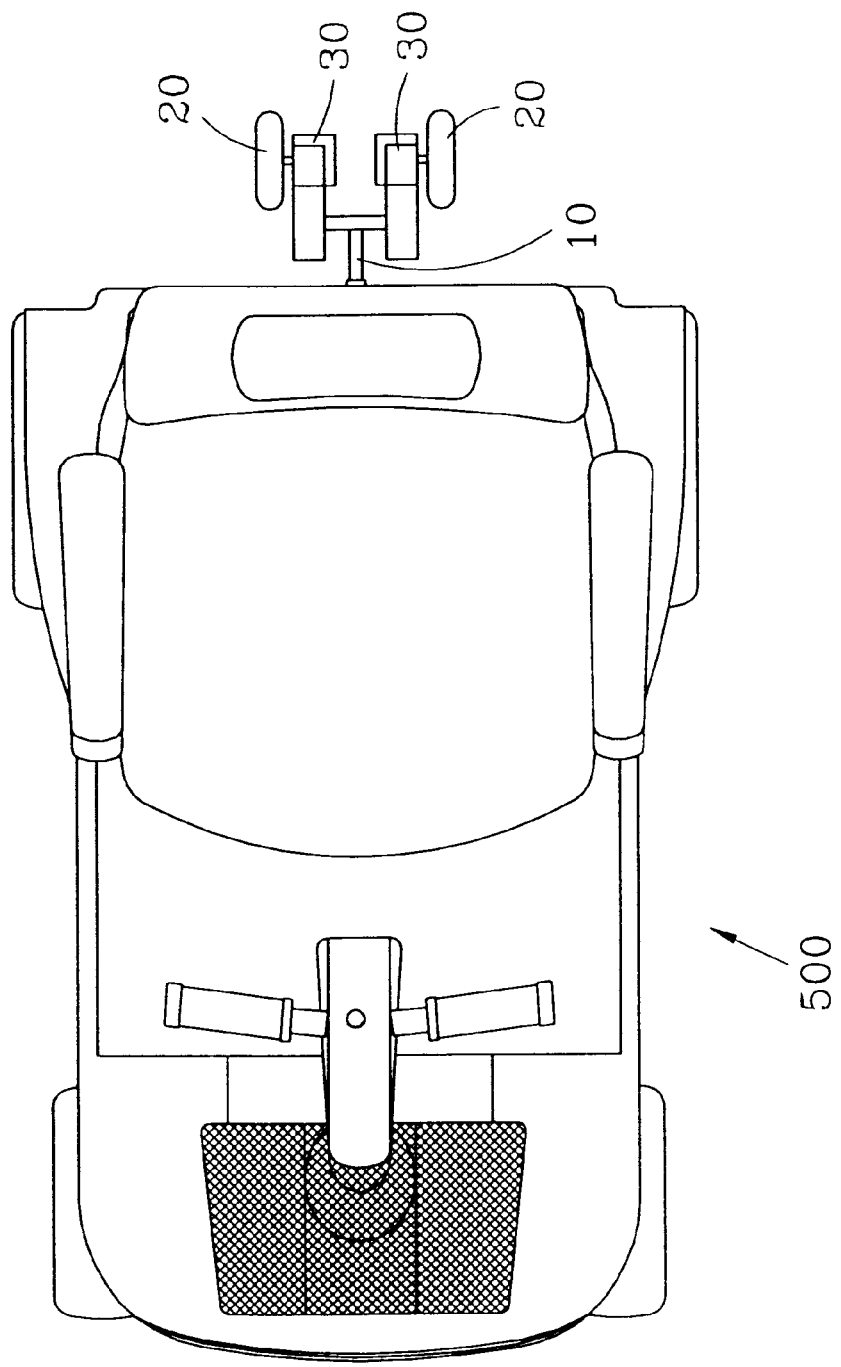
FIG. 31 is a top view showing the third embodiment of the present invention in FIG. 17 being used with a motorized four-wheel invalid vehicle.
Figure 32:
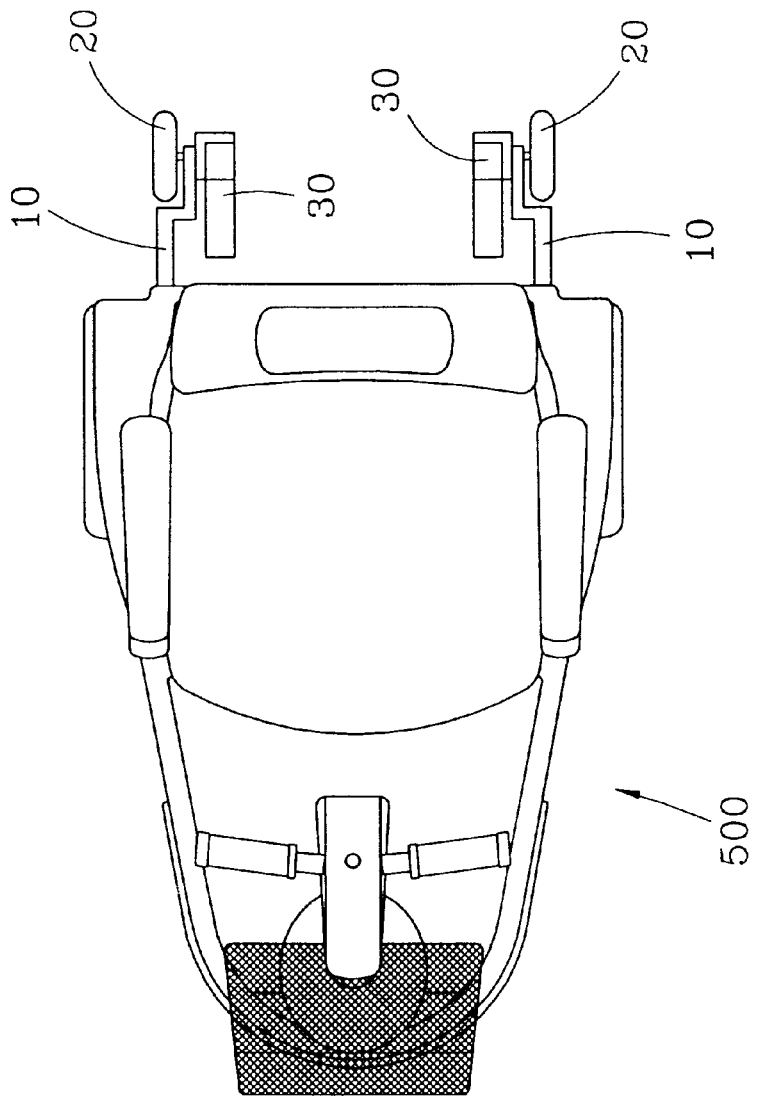
FIG. 32 is a top view showing the fourth embodiment of the present invention in FIG. 20 being used with a motorized three-wheel invalid vehicle.
Figure 33:
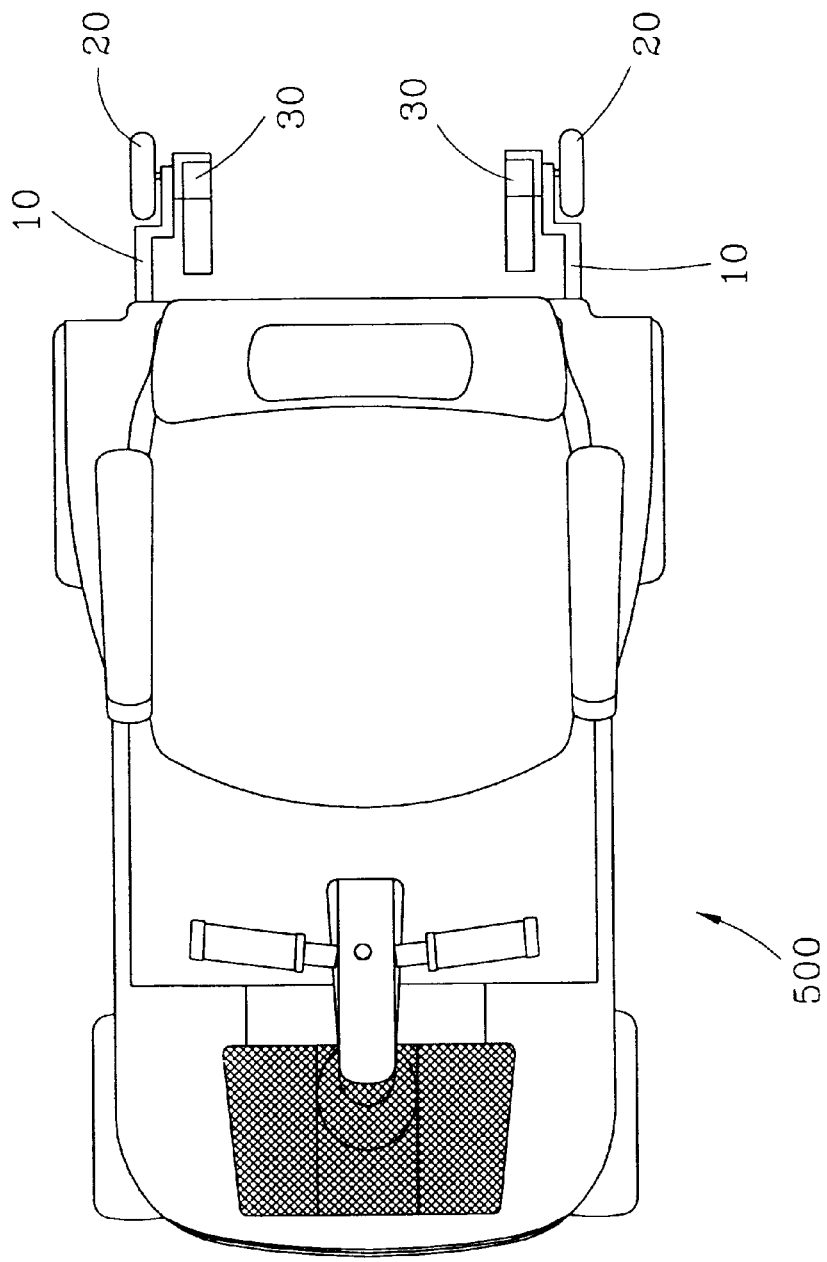
FIG. 33 is a top view showing the fourth embodiment of the present invention in FIG. 20 being used with a motorized four-wheel invalid vehicle.

FIGS. 26, 27 and FIGS. 28, 29 respectively illustrate the first embodiment of the power assist anti-tip wheel system 100 of the present invention shown in FIGS. 6 and 8 being used with general motorized three-wheel and four-wheel invalid vehicles 500. With the present invention, the motorized invalid wheeled vehicles 500 may also smoothly and freely travel onto a slope, pass over a recess, or pass across a bulge on the road surface. FIGS. 27 and 29 are top views showing the power assist anti-tip wheel system 100 of the present invention being detachably connected to the motorized invalid vehicles 500. FIGS. 30 and 31 respectively illustrate the third embodiment of the present invention shown in FIG. 17 being used with general motorized three-wheel and four-wheel invalid vehicles 500. Similarly, this third embodiment of the present invention allows the motorized invalid wheeled vehicles 500 to smoothly and freely travel over any irregularities on a road surface. Again, the connecting support 10 in this embodiment can be detachably connected to the motorized invalid wheeled vehicles 500.

Figure 34:
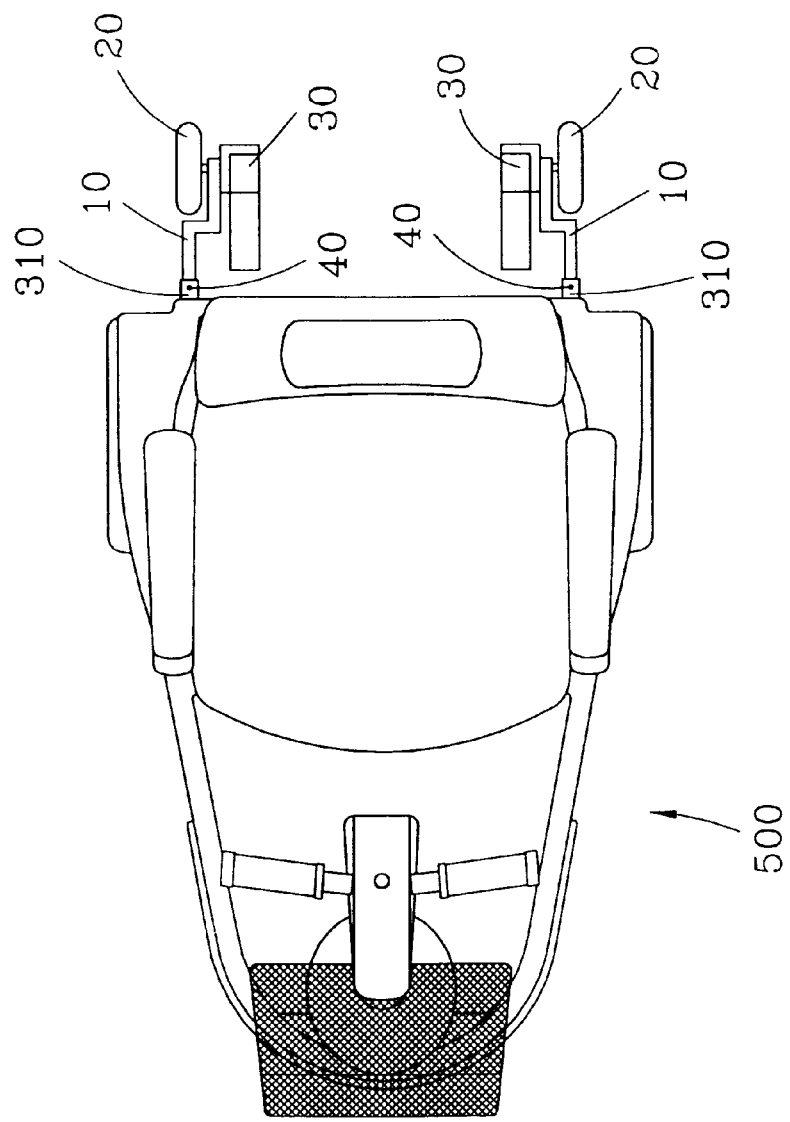
FIG. 34 is a top view showing the fourth embodiment of the present invention in FIG. 23 being used with a motorized three-wheel invalid vehicle.
Figure 35:
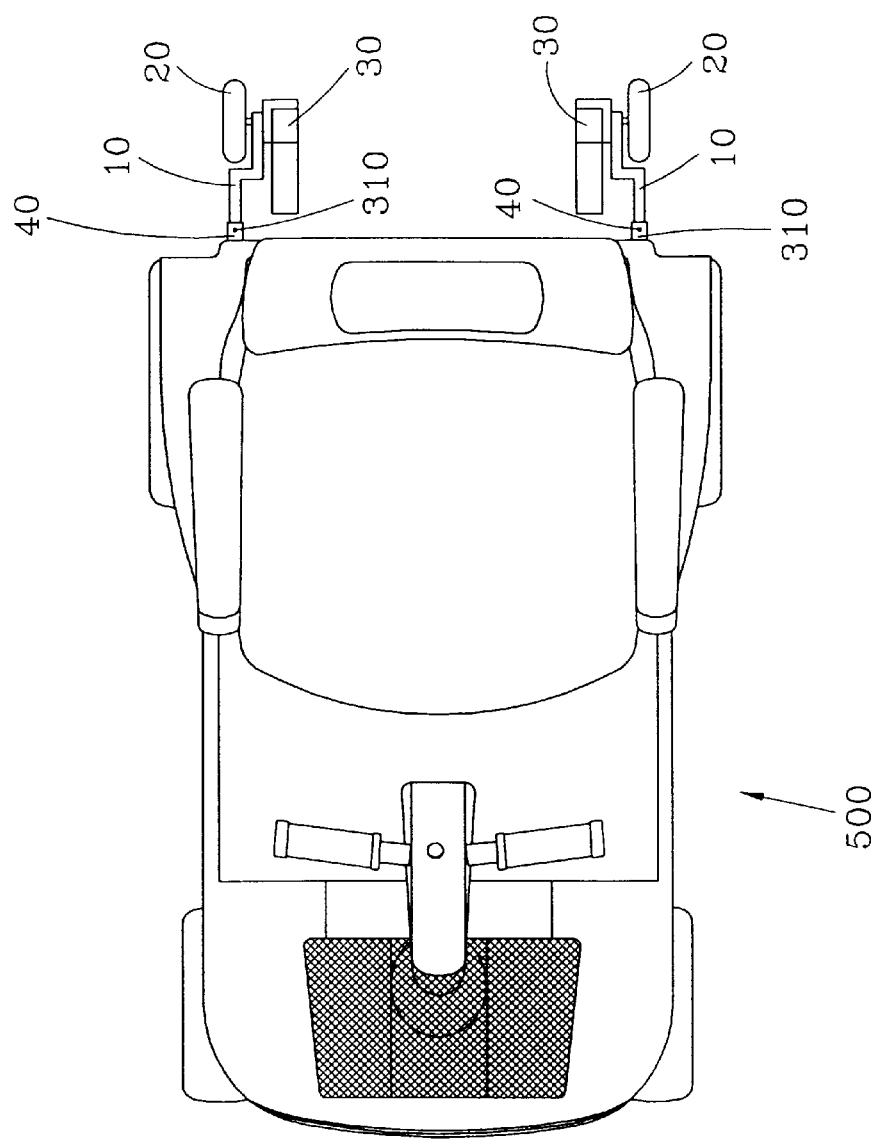
FIG. 35 is a top view showing the fourth embodiment of the present invention in FIG. 23 being used with a motorized four-wheel invalid vehicle.

FIGS. 32, 34 and FIGS. 33, 35 respectively illustrate the fourth embodiment of the power assist anti-tip wheel system 100 of the present invention shown in FIGS. 20 and 23 being used with general motorized three-wheel and four-wheel invalid vehicles 500. With the present invention, the motorized invalid wheeled vehicles 500 may also smoothly and freely travel onto a slope, pass over a recess, or pass across a bulge on the road surface. FIGS. 34 and 35 are top views showing the power assist anti-tip wheel system 100 of the present invention being detachably connected to the motorized invalid wheeled vehicles 500.

Finally, please refer to FIG. 36 which shows a front-wheel drive invalid carriage 200 having a power assist anti-tip wheel system 100 as described in FIGS. 6 to 35 connected to a front end of the invalid carriage 200. Just like the embodiments illustrated in FIGS. 6 to 35, the power assist anti-tip wheel system 100 illustrated in FIG. 36 can also help the invalid carriage 200 to smoothly and safely travel onto a slope, pass over a recess, and pass across a bulge on a road surface.

What is claimed is:

1. A power assist anti-tip wheel system for invalid carriage, comprising at least one connecting support having one end connected to a front or a rear side of a main frame of said invalid carriage, at least one assist anti-tip wheel connected to another end of said at least on connecting support, and at least one power driving means mounted on said connecting supports to associate with said at least on assist anti-tip wheel, whereby when said invalid carriage passes irregularities on a road surface and causes two drive wheels of said invalid carriage to become suspended and idling, said at least one power driving means can be actuated to rotate said at least one assist anti-tip wheel to help said invalid carriage to contact with the road surface to operate in a normal manner again.

2. A power assist anti-tip wheel system for invalid carriage as claimed in claim 1, wherein said connecting support includes a middle crossbar and two arms separately extending from two ends of the middle crossbar at a right angle with the crossbar.

3. A power assist anti-tip wheel system for invalid carriage as claimed in claim 1, wherein said connecting support is a substantially T-shaped member.

4. A power assist anti-tip wheel system for invalid carriage as claimed in claim 1, wherein said connecting support is a substantially straight bar-like member.

5. A power assist anti-tip wheel system for invalid carriage as claimed in claim 1, wherein said at least one connecting support is provided near an end connected to said main frame of said invalid carriage with a hole and said main frame of said invalid carriage has at least one hollow connecting section extending from a front or a rear side of said main frame for said at least one connecting support to insert thereinto, whereby said hole on said at least one connecting support shall align with an insertion hole provided on said at least one connecting section of said main frame to allow at least one insertion pin to insert thereinto and thereby detachably lock said at least one connecting support and accordingly the whole power assist anti-tip wheel system to said invalid carriage via said main frame.

6. A power assist anti-tip wheel system for invalid carriage as claimed in claim 2, wherein said at least one connecting support is provided near an end connected to said main frame of said invalid carriage with a hole and said main frame of said invalid carriage has at least one hollow connecting section extending from a front or a rear side of said main frame for said at least one connecting support to insert thereinto, whereby said hole on said at least one connecting support shall align with an insertion hole provided on said at least one connecting section of said main frame to allow at least one insertion pin to insert thereinto and thereby detachably lock said at least one connecting support and accordingly the whole power assist anti-tip wheel system to said invalid carriage via said main frame.

7. A power assist anti-tip wheel system for invalid carriage as claimed in claim 3, wherein said at least one connecting support is provided near an end connected to said main frame of said invalid carriage with a hole and said main frame of said invalid carriage has at least one hollow connecting section extending from a front or a rear side of said main frame for said at least one connecting support to insert thereinto, whereby said hole on said at least one connecting support shall align with an insertion hole provided on said at least one connecting section of said main frame to allow at least one insertion pin to insert thereinto and thereby detachably lock said at least one connecting support and accordingly the whole power assist anti-tip wheel system to said invalid carriage via said main frame.

8. A power assist anti-tip wheel system for invalid carriage as claimed in claim 4, wherein said at least one connecting support is provided near an end connected to said main frame of said invalid carriage with a hole and said main frame of said invalid carriage has at least one hollow connecting section extending from a front or a rear side of said main frame for said at least one connecting support to insert thereinto, whereby said hole on said at least one connecting support shall align with an insertion hole provided on said at least one connecting section of said main frame to allow at least one insertion pin to insert thereinto and thereby detachably lock said at least one connecting support and accordingly the whole power assist anti-tip wheel system to said invalid carriage via said main frame.

9. A power assist anti-tip wheel system for invalid carriage as claimed in claim 1, wherein said power assist anti-tip wheel system includes two connecting supports which support two assist anti-tip wheels and area separately connected to and near two outer ends of the front or the rear side of said main frame of said invalid carriage, so that said two assist anti-tip wheels together with said two drive wheels of said invalid carriage form a four-wheel transmission structure.

10. A power assist anti-tip wheel system for invalid carriage as claimed in claim 1, wherein said power driving means includes a circuit capable of sensing a suspension and idle state of said drive wheels of said invalid carriage and automatically actuating said power driving means to rotate said at least one assist anti-tip wheel when such suspension and idle state of said drive wheels is sensed.

11. A power assist anti-tip wheel system for invalid carriage as claimed in claim 1, wherein said power driving means includes an electrically connected push button or switch provided on said invalid carriage, whereby when said drive wheels of said invalid carriage become suspended and idling, said push button or switch can be operated to manually actuate said power driving means to rotate said at least one assist anti-tip wheel.

12. A power assist anti-tip wheel system for invalid carriage as claimed in claim 1, wherein said power driving means is formed from an electric motor and a set of transmission gears.

* * * * *